(12) United States Patent
Petit et al.

(10) Patent No.: US 10,207,210 B2
(45) Date of Patent: Feb. 19, 2019

(54) HIGH FLOW DISC FILTER

(71) Applicant: EVOQUA WATER TECHNOLOGIES LLC, Warrendale, PA (US)

(72) Inventors: Peter J. Petit, Pewaukee, WI (US); William E. Davis, Brookfield, WI (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 15/074,031

(22) Filed: Mar. 18, 2016

(65) Prior Publication Data

US 2017/0043284 A1 Feb. 16, 2017

Related U.S. Application Data

(63) Continuation of application No. 14/689,532, filed on Apr. 17, 2015, now abandoned, which is a
(Continued)

(51) Int. Cl.
*C02F 1/00* (2006.01)
*B01D 29/01* (2006.01)
(Continued)

(52) U.S. Cl.
CPC .......... *B01D 33/23* (2013.01); *B01D 29/012* (2013.01); *B01D 29/07* (2013.01); *B01D 33/0093* (2013.01); *B01D 33/11* (2013.01); *B01D 33/21* (2013.01); *B01D 33/50* (2013.01); *C02F 1/004* (2013.01); *B01D 2201/127* (2013.01);
(Continued)

(58) Field of Classification Search
CPC ........ B01D 33/23; B01D 33/50; B01D 29/07; B01D 33/21; B01D 33/11; B01D 33/0093; B01D 29/012; B01D 2201/127; C02F 1/004; C02F 2201/002; C02F 2303/16; Y10T 29/49826; Y10T 29/49817
See application file for complete search history.

(56) References Cited

U.S. PATENT DOCUMENTS

| 1,685,118 A | 9/1928 | Campbell |
| 1,712,258 A | 5/1929 | Compain |
(Continued)

FOREIGN PATENT DOCUMENTS

| CA | 2023302 A1 | 2/1991 |
| CA | 2070341 A1 | 12/1992 |
(Continued)

OTHER PUBLICATIONS

Algas Fluid Technology Systems AS, Environmental Protection Made Profitable, Feb. 3, 2004, 4 pages, Moss Norway.
(Continued)

*Primary Examiner* — David C Mellon

(57) ABSTRACT

A filter device is configured to filter a liquid. The filter device includes a drum sized to receive the liquid and a plurality of filter panels coupled to the drum to define a plurality of discs. The liquid passes through at least a portion of one of the discs. Each filter panel includes a perimeter frame that defines a panel normal flow area and a filter media coupled to the perimeter frame. The filter media may be adapted to include a plurality of pleats.

14 Claims, 25 Drawing Sheets

US 10,207,210 B2
Page 2

Related U.S. Application Data continuation of application No. 11/836,962, filed on Aug. 10, 2007, now Pat. No. 9,028,692.

(60) Provisional application No. 60/950,476, filed on Jul. 18, 2007, provisional application No. 60/950,484, filed on Jul. 18, 2007, provisional application No. 60/822,305, filed on Aug. 14, 2006.

(51) Int. Cl.
| | |
|---|---|
| B01D 29/07 | (2006.01) |
| B01D 33/00 | (2006.01) |
| B01D 33/11 | (2006.01) |
| B01D 33/21 | (2006.01) |
| B01D 33/23 | (2006.01) |
| B01D 33/50 | (2006.01) |

(52) U.S. Cl.
CPC .... C02F 2201/002 (2013.01); C02F 2303/16 (2013.01); Y10T 29/49817 (2015.01); Y10T 29/49826 (2015.01)

(56) References Cited

U.S. PATENT DOCUMENTS

| | | |
|---|---|---|
| 1,804,934 A | 5/1931 | Hoyt et al. |
| 1,826,485 A | 10/1931 | Thorne |
| 1,833,315 A | 11/1931 | Burhans |
| 2,022,069 A | 11/1935 | Bryan |
| 2,076,104 A | 4/1937 | Vinton |
| 2,464,223 A | 3/1949 | Genter |
| 2,964,194 A | 12/1960 | Oliver et al. |
| 3,163,601 A | 12/1964 | Erickson et al. |
| 3,193,105 A | 7/1965 | Putnam et al. |
| 3,221,887 A * | 12/1965 | Schade ............ B03B 5/56 210/327 |
| 3,331,512 A | 7/1967 | Vore |
| 3,363,770 A | 1/1968 | Glos, II |
| 3,369,688 A | 2/1968 | Glos, II |
| 3,438,505 A | 4/1969 | Luthi |
| 3,471,026 A | 10/1969 | Riker et al. |
| 3,485,376 A | 12/1969 | Peterson et al. |
| 3,610,419 A | 10/1971 | Vallee et al. |
| 3,643,803 A | 2/1972 | Glos, II |
| 3,692,181 A | 9/1972 | Davis |
| 3,948,779 A | 4/1976 | Jackson |
| 4,139,472 A | 2/1979 | Simonson |
| 4,162,982 A | 7/1979 | Chesner |
| 4,256,580 A | 3/1981 | Rimmele |
| 4,268,385 A | 5/1981 | Yoshikawa |
| 4,330,405 A | 5/1982 | Davis et al. |
| 4,346,008 A | 8/1982 | Leighton et al. |
| 4,617,122 A | 10/1986 | Kruse et al. |
| 4,639,315 A | 1/1987 | Fuchs et al. |
| 4,655,920 A | 4/1987 | Ragnegard |
| 4,710,294 A | 12/1987 | Ziller |
| 4,781,835 A | 11/1988 | Bahr et al. |
| 4,814,093 A | 3/1989 | Frykhult |
| 4,838,910 A | 6/1989 | Stollenwerk et al. |
| 4,865,732 A | 9/1989 | Garrant et al. |
| 4,950,403 A | 8/1990 | Hauff et al. |
| 5,037,562 A | 8/1991 | Tarves, Jr. |
| 5,076,924 A | 12/1991 | Persson et al. |
| 5,084,174 A | 1/1992 | Perala et al. |
| 5,087,358 A | 2/1992 | Massignani |
| 5,227,065 A | 7/1993 | Strid |
| 5,242,590 A | 9/1993 | Thomson et al. |
| 5,296,143 A | 3/1994 | Frykhult |
| 5,304,304 A | 4/1994 | Jakobson et al. |
| 5,330,645 A | 7/1994 | Geldmacher |
| 5,330,646 A | 7/1994 | Frykhult |
| 5,635,062 A | 6/1997 | Cameron et al. |
| 5,647,982 A | 7/1997 | Haythornthwaite et al. |
| 5,667,680 A | 9/1997 | Haeffner |
| 5,685,983 A | 11/1997 | Frykhult |
| 5,759,397 A | 6/1998 | Larsson et al. |
| 5,766,466 A | 6/1998 | Peterson |
| 5,792,352 A | 8/1998 | Scheucher et al. |
| 5,804,071 A | 9/1998 | Haeffner |
| 5,820,756 A | 10/1998 | McEwen et al. |
| 5,893,972 A | 4/1999 | Peterson |
| 5,928,396 A | 7/1999 | Choi |
| 6,113,783 A | 9/2000 | Strid et al. |
| 6,231,761 B1 | 5/2001 | Mohlin et al. |
| 6,231,764 B1 | 5/2001 | Wilkins |
| 6,447,617 B1 | 9/2002 | Bergmann |
| 6,461,507 B1 | 10/2002 | Ishigaki et al. |
| D497,660 S | 10/2004 | Danielsson et al. |
| 7,255,723 B2 | 8/2007 | Choi et al. |
| 7,293,659 B2 | 11/2007 | Grace |
| 7,314,556 B2 | 1/2008 | Sheets et al. |
| 7,597,805 B2 | 10/2009 | Danielsson et al. |
| 8,118,175 B2 | 2/2012 | Davis et al. |
| 8,343,248 B2 | 1/2013 | Suzuki et al. |
| 2002/0050283 A1 | 5/2002 | Bergmann |
| 2002/0195388 A1 | 12/2002 | Sierens et al. |
| 2004/0232076 A1 | 11/2004 | Zha et al. |
| 2005/0082217 A1 | 4/2005 | Hagg et al. |
| 2005/0121381 A1 | 6/2005 | Sheets et al. |
| 2011/0024347 A1 | 2/2011 | Larsson et al. |
| 2014/0123494 A1 | 5/2014 | Bailey |

FOREIGN PATENT DOCUMENTS

| | | |
|---|---|---|
| CA | 2149090 A1 | 11/1996 |
| CN | 1281378 A | 1/2001 |
| CN | 1557525 A | 12/2004 |
| CN | 1742133 A | 3/2006 |
| CN | 1753716 A | 3/2006 |
| DE | 9319221 U1 | 2/1994 |
| EP | 0247445 A1 | 12/1987 |
| EP | 1090665 A2 | 4/2001 |
| EP | 1205265 A2 | 5/2002 |
| EP | 1596958 A1 | 11/2005 |
| EP | 1961475 A1 | 8/2008 |
| FR | 2595957 A1 | 9/1987 |
| GB | 861751 A | 2/1961 |
| GB | 957991 A | 5/1964 |
| JP | 2002126800 A | 5/2002 |
| JP | 2008119608 A | 5/2008 |
| SE | 224131 C1 | 1/1969 |
| SE | 526692 C2 | 10/2005 |
| WO | 9112067 A1 | 8/1991 |
| WO | 9419088 A1 | 9/1994 |
| WO | 9735656 A1 | 10/1997 |
| WO | 9811972 A1 | 3/1998 |
| WO | 9930797 A1 | 6/1999 |
| WO | 2000037159 A1 | 6/2000 |
| WO | 0076620 A1 | 12/2000 |
| WO | 02085487 A1 | 10/2002 |
| WO | 03039712 A1 | 5/2003 |
| WO | 03051487 A1 | 6/2003 |
| WO | 2004076026 A1 | 9/2004 |
| WO | 2008002240 A1 | 1/2008 |
| WO | 2008021270 A2 | 2/2008 |
| WO | 2009011864 A1 | 1/2009 |
| WO | 2012030285 A1 | 3/2012 |

OTHER PUBLICATIONS

Algas, Algas Thickener, Feb. 3, 2004, 4 pages, Moss, Norway.
Algas, More than NOK 2 Million Measures, Feb. 3, 2004, 1 page.
Algas, Raw Water Treatment, Feb. 3, 2004, 1 page.
Envirex, Rex Microscreens, Bulletin—Product Features and Benefits, 1989, 12 pages, Waukesha, Wisconsin USA.
Envirex, Rex Microscreens, Bulliten No. 315-31, 1989, 8 pages, Waukesha, Wisconsin, USA.
Envirex, Rex Rotary Drum Vacuum Filters, at least as early as Aug. 1, 2005, 6 pages, Waukesha, Wisconsin USA.
GL&V Dorr-Oliver, The American Disc Filter, Bulliten 7202, 2000, 7 pages.

(56) References Cited

OTHER PUBLICATIONS

Hans Huber AG, Huber Technology, Rotafilt Cloth Filtration Plant, Aug. 1997, 5 pages, Germany.
Material re: 1999 Hydrotech Installation at Anniston, AL Wastewater Treatment Plant.
Material re: 2002 Hydrotech Installation (Filtertype HSF2110-2F; Serial No. 2931) at Casale Wastewater Treatment Plant.
Material re: 2002 Hydrotech Installation (Filtertype HSF3112-2F; Serial Nos. 3013 et seq.) at Pero Wastewater Treatment Plant.
Material re: Hydrotech Disc Filter (Filtertype HSF1702-1H; Serial No. 2351; 2000).
Material re: Hydrotech Disc Filter (Filtertype HSF2108-1F; Serial No. 2455; 2001).
Nordic Water Products AB, Efficient Filtration with DynaDisc Filter, at least as early as Aug. 1, 2005, 8 pages, Sweden.

\* cited by examiner

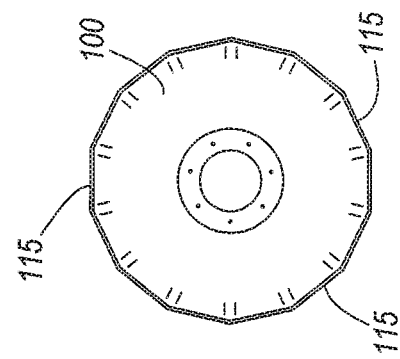
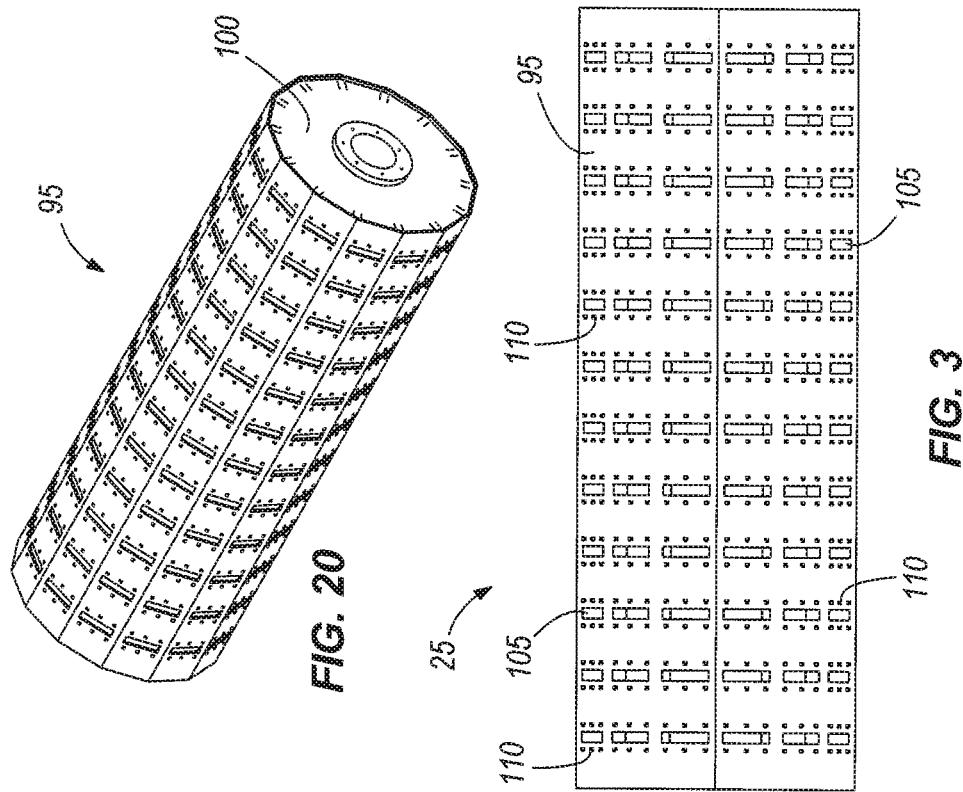
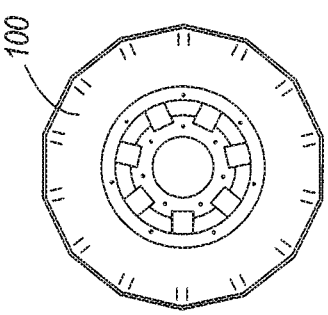

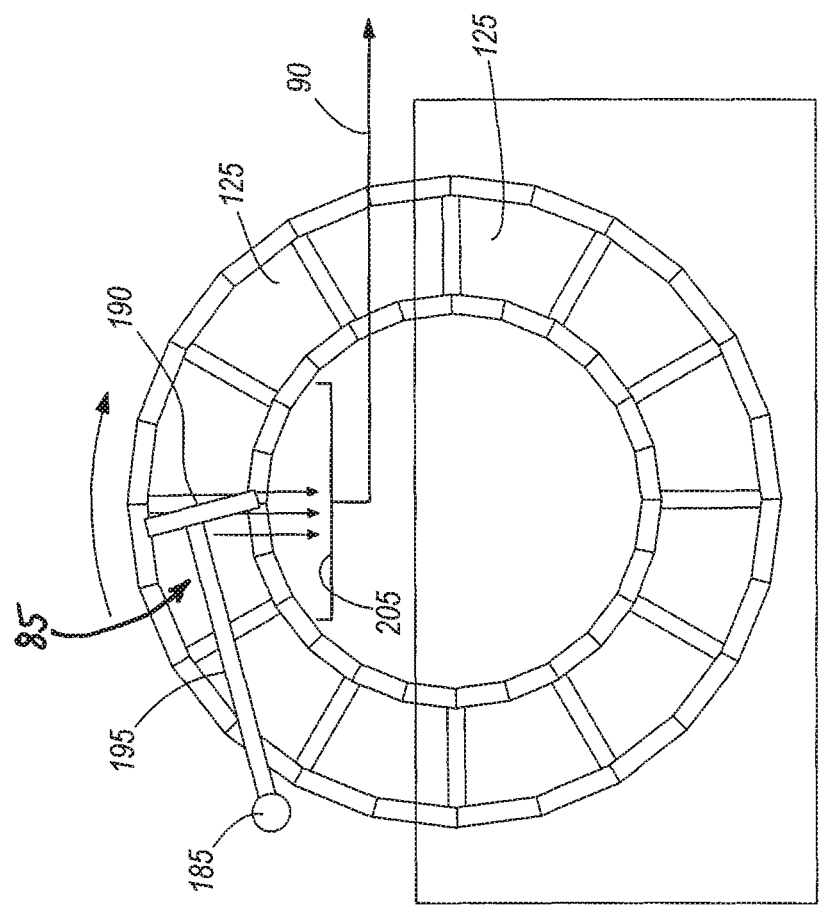
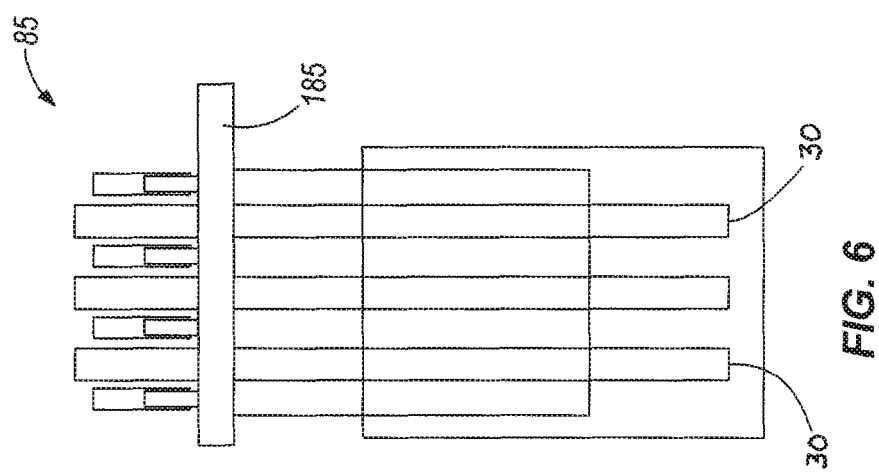

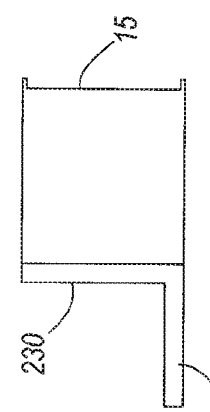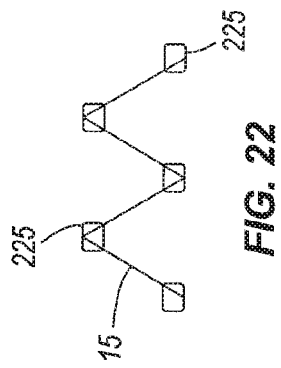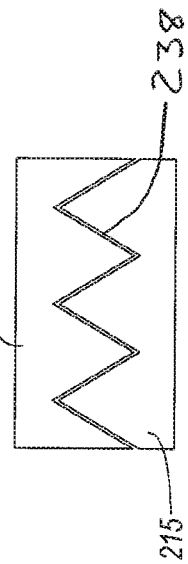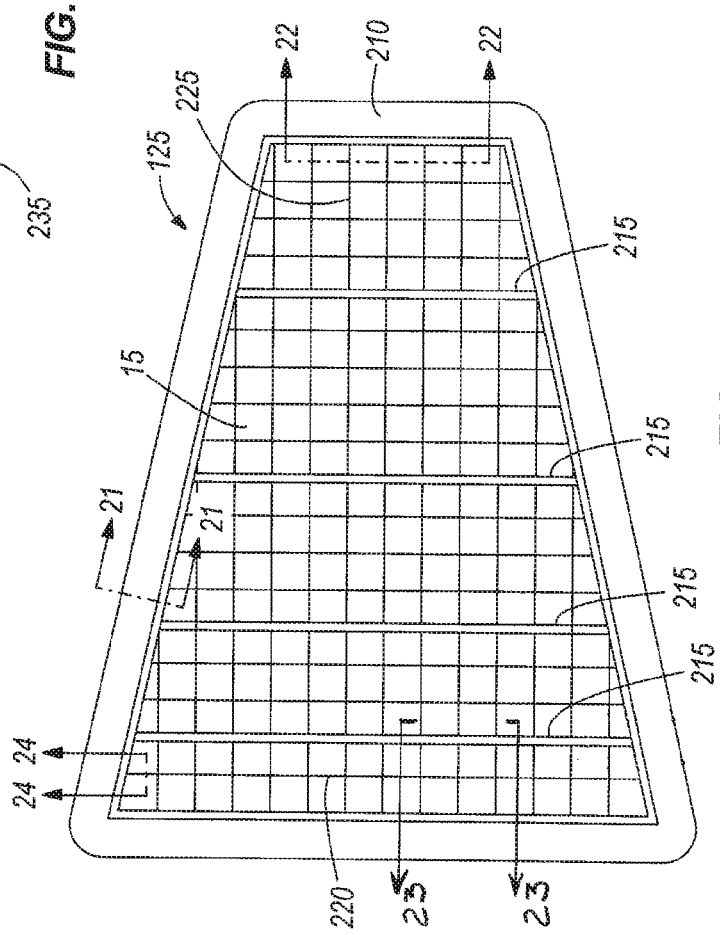

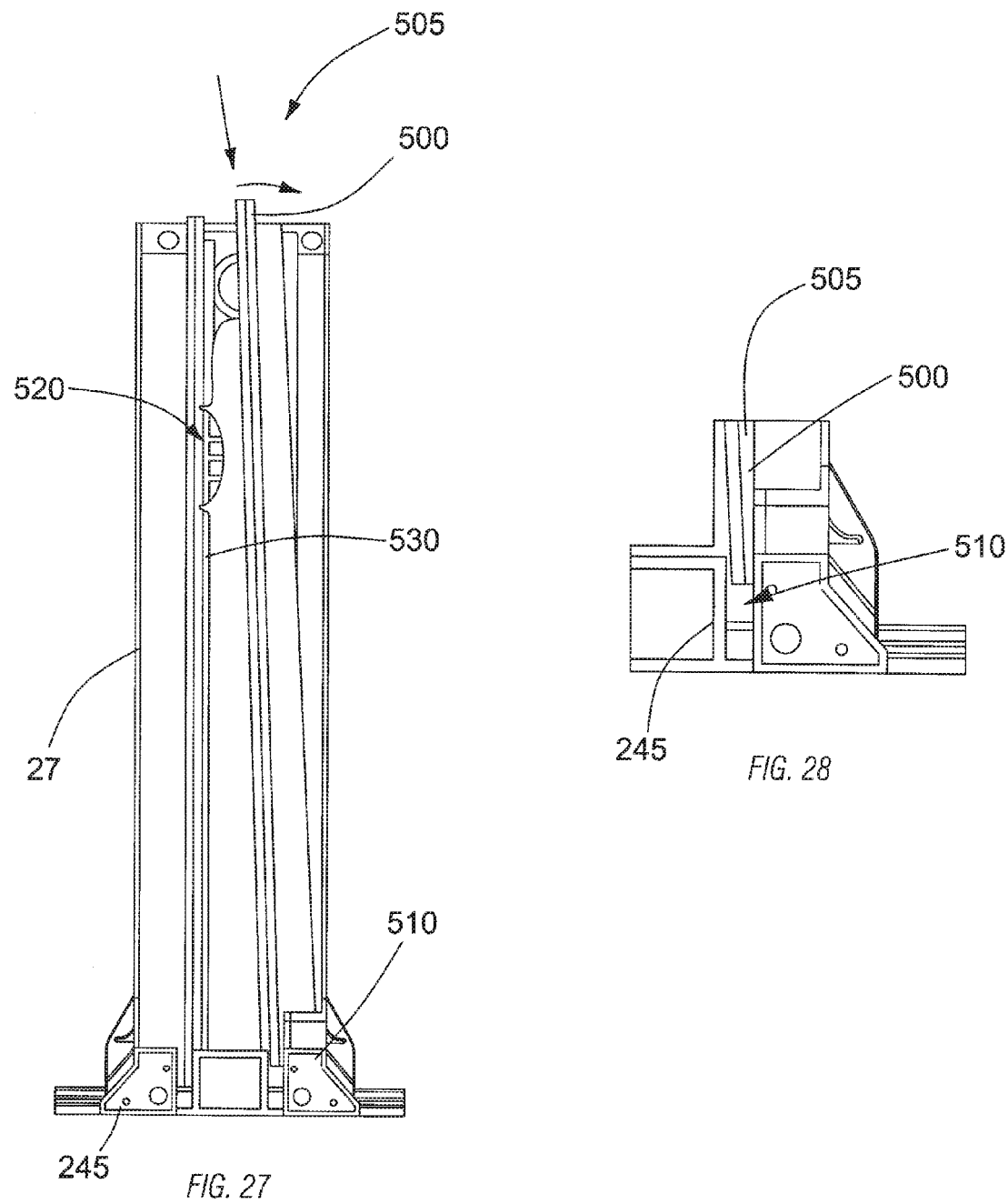

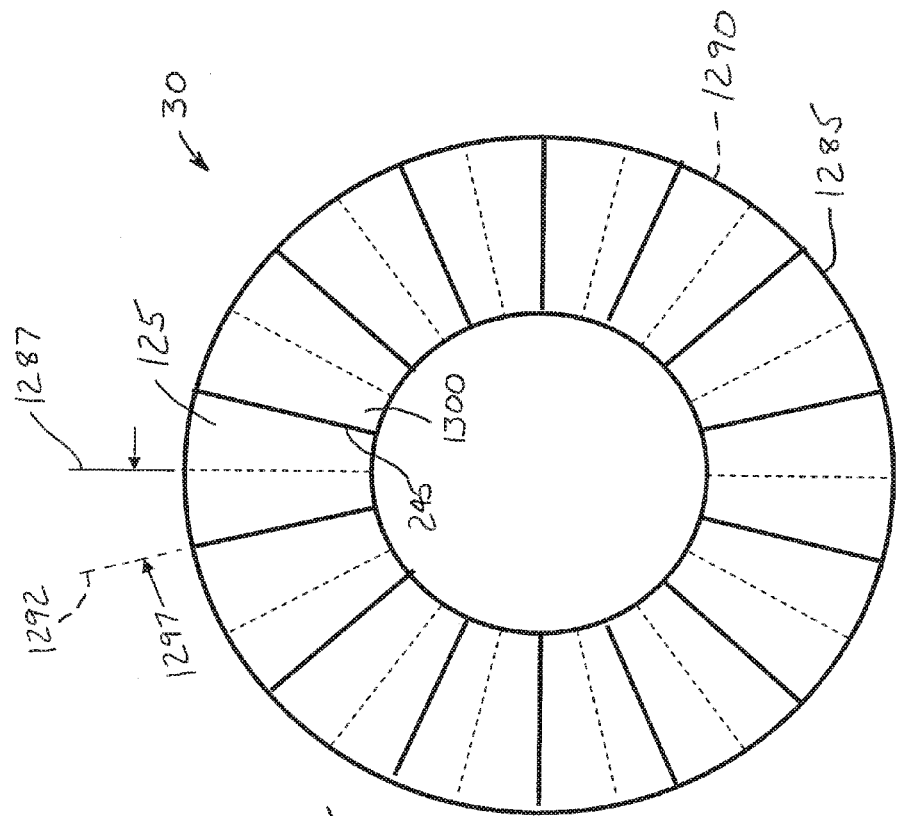
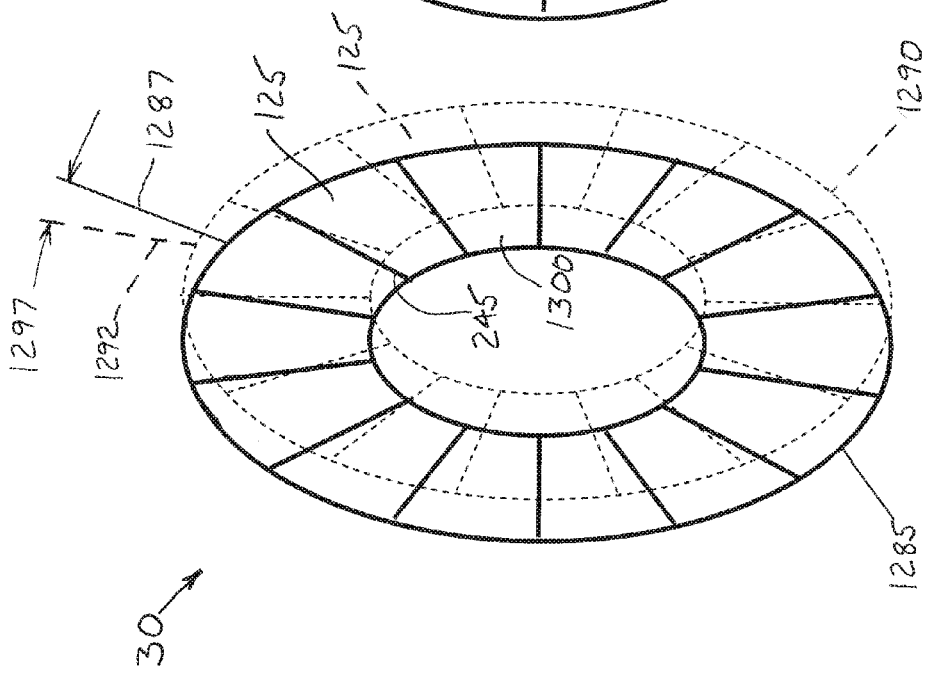

HIGH FLOW DISC FILTER

CROSS-REFERENCE TO RELATED APPLICATIONS

This application is a continuation of and claims priority to U.S. Non-Provisional patent application Ser. No. 14/689,532, filed on Apr. 17, 2015, titled HIGH FLOW DISC FILTER, which is a continuation of U.S. Non-Provisional patent application Ser. No. 11/836,962, filed on Aug. 10, 2007, titled HIGH FLOW DISC FILTER, now U.S. Pat. No. 9,028,692, which in turn claims priority to U.S. Provisional Application No. 60/822,305, filed Aug. 14, 2006, U.S. Provisional Application No. 60/950,484, filed Jul. 18, 2007, and U.S. Provisional Application No. 60/950,476, filed Jul. 18, 2007, the entire disclosure of each of which is hereby incorporated herein by reference in its entirety for all purposes.

BACKGROUND

The invention relates to a high flow filter and to certain embodiments that relate to a pleated filter media for use in a high flow compact disc filter arrangement for filtering liquids.

A conventional biological wastewater treatment plant typically incorporates a gravity clarifier at the end of the process, to clean the effluent water to a sufficient level to allow for discharge into a natural body of water such as a lake or river. In regions where water is scarce, it may be desirable to further filter and disinfect the water to allow for safe "reuse" of the water, for example, watering grass on public grounds.

Large gravity-driven drum filter screens can be used to filter the effluent water from the wastewater treatment plant. However, in large scale treatment plants (e.g., one million gallons per day or more) drum filter screens are costly per unit of capacity. In other words, multiple large drum filters, including many filter screens, are required to provide sufficient filter media area to filter the quantity of effluent that must pass through the system.

Disc filters have been employed to increase the surface area of the filter media without increasing the land area required by the screening equipment. For a given flow, a disc filter with flat filter panels employs a geometry which requires less land area than a drum filter with equivalent capacity. Although pump pressure driven strainers can be smaller, flat panel disc filters currently provide the minimum land area required in a gravity-driven filtration system for such applications.

While pleated filter media is commonly used in applications that filter gasses (e.g., air), their use in liquid applications is somewhat limited due to the higher viscosity of the fluids, to low flow uses and liquids containing low solids levels. High flows generate large pressure drops which tend to deform the pleats, and may result in tearing of the media or other loss of function unless managed well by the designers. In particular, pleated filter media has been very difficult to adapt to large scale filtering operations such as those that are commonly employed to filter water in a large water treatment facility. In these applications, the high volume of flow required would require very large surface areas to reduce the volumetric flow per unit area to a level that is acceptable by prior art pleated media. The present invention overcomes these limitations and provides a high flow pleated filter that is substantially smaller and robust than what could be achieved using prior art filters.

SUMMARY

The present invention provides a filter device configured to filter a liquid. In one construction, the filter device includes a drum sized to receive the liquid and a plurality of filter panels coupled to the drum to define a plurality of discs. The liquid passes through at least a portion of one of the discs. Each filter panel includes a perimeter frame defining a panel normal flow area, and a filter media coupled to the perimeter frame.

In another construction, the invention provides a filter device configured to filter a liquid. The filter device includes a drum sized to receive the liquid and a plurality of filter panels coupled to the drum to define a plurality of discs. The liquid passes through at least a portion of one of the discs. Each filter panel includes a perimeter frame that defines a panel normal flow area and a filter media coupled to the perimeter frame. The filter media includes a plurality of pleats.

In another construction, the invention provides a filter panel configured for use in a filter device that filters a liquid. The filter panel includes a perimeter frame that defines a panel normal flow area, a pleat reinforcing member extending across the panel normal flow area, and a filter media coupled to the perimeter frame and the pleat reinforcing member. The filter media defines a media normal flow area that is substantially greater than the panel normal flow area.

In still another construction, the invention provides a filter panel configured for use in a filter device that filters a liquid. The filter panel includes a perimeter frame that defines a panel normal flow area, a stringer that extends across the panel normal flow area, a ridge bar that extends from the stringer in a direction substantially normal to the stringer, and a filter media that includes a plurality of pleats. The filter media is coupled to the perimeter frame, the stringer, and the ridge bar. The perimeter frame, the stringer, and the ridge bar are integrally-formed as a single component around the filter media.

In another construction, the invention provides a method of making a filter panel configured to filter a fluid. The method includes positioning a filter media in an open mold, closing the open mold to define a plurality of pleats in the filter media, and injecting a plastic material into the mold. The plastic material flows around the pleated filter media to define a perimeter frame having a first side and a second side and a plurality of pleat reinforcing members.

In still another construction, the invention provides a method of filtering a fluid using a plurality of filter panels arranged in a plurality of discs. The method includes directing a flow of unfiltered fluid between a pair of adjacent discs, passing the unfiltered fluid through a pleated filter media that at least partially defines each of the panels, selectively rotating the plurality of discs, and selectively backwashing the filter panels.

In yet another construction, the invention facilitates the performance of a method by providing equipment adapted to the performance of the method. The method includes directing a flow of unfiltered fluid between a pair of adjacent discs, passing the unfiltered fluid through a pleated filter media that at least partially defines each of the panels, selectively rotating the plurality of discs, and selectively backwashing the filter panels.

In still another construction, the invention provides a method of installing a filter panel in a disc filter that includes a plurality of filter panels arranged to define a plurality of discs. The method includes providing a pleated filter panel having a perimeter, positioning a gasket around the perimeter of the pleated filter panel, inserting a portion of the pleated filter panel in a slot, and rotating the pleated filter panel. The method also includes sandwiching a portion of the pleated filter panel between a locking device and a filter support structure to support the pleated filter panel in a substantially vertical orientation.

In yet another construction, the invention provides a method of replacing the filter media in a, disc filter having a drum and non-pleated filter media coupled to the drum. The method includes removing the non-pleated filter media from the drum, coupling a plurality of filter supports to the drum, and inserting a pleated filter panel in each of the filter supports to define a plurality of discs.

BRIEF DESCRIPTION OF THE DRAWINGS

FIG. 3 is a side view of a drum of the disc filter of FIG. 1;

FIG. 5 is a front schematic view of a portion of the disc filter of FIG. 1;

FIG. 6 is a side schematic view of a portion of the disc filter of FIG. 1;

FIG. 11 is a front view of the filter panel of FIG. 9;

FIG. 18 is an end view of the drum of FIG. 3;

FIG. 19 is another end view of the drum of FIG. 3;

FIG. 20 is a perspective view of the drum of FIG. 3;

FIG. 21 is a section view of a portion of the filter panel of FIG. 11 taken along line 21-21 of FIG. 11;

FIG. 22 is a section view of a portion of the filter panel of FIG. 11 taken along line 22-22 of FIG. 11;

FIG. 23 is a section view of a portion of the filter panel of FIG. 11 taken along line 23-23 of FIG. 11;

FIG. 24 is a section view of a portion of the filter panel of FIG. 11 taken along line 24-24 of FIG. 11;

FIG. 27 is a side view of a filter support box during the installation of a gasketed filter element;

FIG. 28 is an enlarged side view of a portion of the filter support box receiving the gasketed filter element;

FIG. 36 is a perspective schematic illustration of an alternate arrangement wherein the filter panels of a disc are offset with respect to one another; and FIG. 37 is a front schematic illustration of the alternate arrangement of FIG. 36.

DETAILED DESCRIPTION

Figure 1:
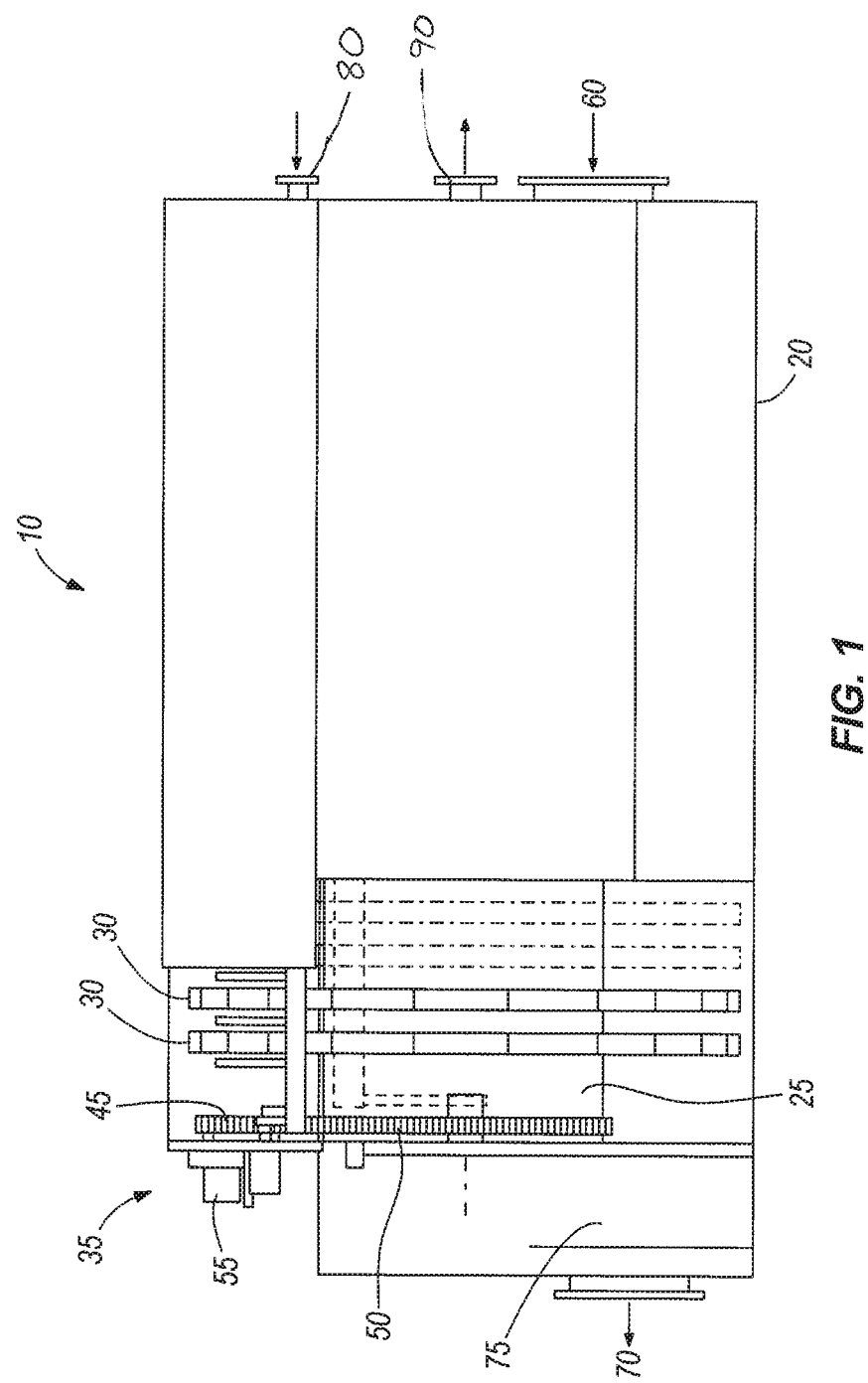
FIG. 1 is a partially broken away side view of a disc filter including a plurality of filter panels embodying the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. For example, the teachings of this invention apply not only to disc filters, but also may be adapted to drum type and other type filters that are used to filter high volume, high solids content fluids. The teachings apply not only to "inside-out" type filters using liquid head difference as a filtration driving force, but also apply to vacuum type filters, including "outside-in" type filters, and filters that operate in an enclosed vessel under pressure. Such type filters are exemplified and described in more detail in the brochures titled REX MICROSCREENS published by Envirex and dated 08/89, REX Rotary Drum Vacuum Filters published by Envirex, and REX MICROSCREENS Solids Removal For . . . published by Envirex in 1989 which are hereby incorporated herein by reference in their entirely. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

While the invention illustrated herein is described as being employed in a waste water treatment setting, and particularly as a tertiary treatment system, other uses and arrangements are possible. Other wastewater treatment applications include use as a primary or secondary clarifier in a municipal wastewater treatment plant as well as detrashing sludge.

In addition to wastewater treatment uses, the present invention can be used in pulp and paper applications. For example, the invention can be used for white water filtration, improving water quality after save-all filters, fiber recovery, raw water screening in the production of mechanically purified process water, prefiltration in conjunction with a sand filter in the production of chemically purified water, treatment of sealing water for pumps, recirculating the water in wood rooms, thickening pulp and paper stock, and/or replacing Vacuum filters, such as those commonly used in the pulp and paper industry (outside-in flow).

Still other applications include but are not limited to, dewatering coal, taconite processing, service water treatment, cooling water treatment, treating wastewater from galvanization processes, separation of tobacco particles from wastewater, and/or food industry wastewater filtration.

FIG. 1 illustrates one possible disc filter 10 employing pleated filter media 15. The media 15 may be woven or non-woven. In addition, pile cloth, needle felt, microfiltration, nanofiltration, reverse osmosis, or other membranes may be employed as media constructions. Preferred materials for use in making filter media include but are not limited to polyester, metal-coated polyester, antimicrobial-coated polyester, polypropylene, nylon, stainless steel wire, glass fiber, alumina fiber, glass filled polypropylene (17% preferred), glass-filled acetal, and/or glass-filled nylon.

It should be noted that the term "filter media" should be interpreted broadly to cover any component that filters a fluid. Other terms included within the definition of filter media include membrane, element, filter device, and the like. As such, the term "filter media" should not be narrowly interpreted to exclude any component that filters fluid.

The disc filter 10 includes a housing 20, such as a metal tank that substantially encloses a drum 25, a plurality of discs 30, a drive system 35, and a flow system 40. It will be appreciated that variations on this design, including those employing a frame intended to facilitate mounting of the unit in a concrete tank, are also commonly used. The drive system 35 includes at least two bearings that support the drum 25 for rotation. A driven sprocket 50 is coupled to the drum 25 and a drive sprocket 45 is coupled to a motor 55 or other prime mover. In the illustrated construction, a belt engages the drive sprocket 45 and the driven sprocket 50 such that rotation of the motor 55 produces a corresponding rotation of the drum 25. In preferred constructions, the sprockets 45, 50 are sized to produce a significant speed reduction. However, some constructions may employ a slow speed drive with no speed reduction if desired. While the illustrated construction employs a belt drive, other constructions may employ gears, shafts, chains, direct drive, or other means for transferring the rotation of the motor 55 to the drum 25.

Figure 2:
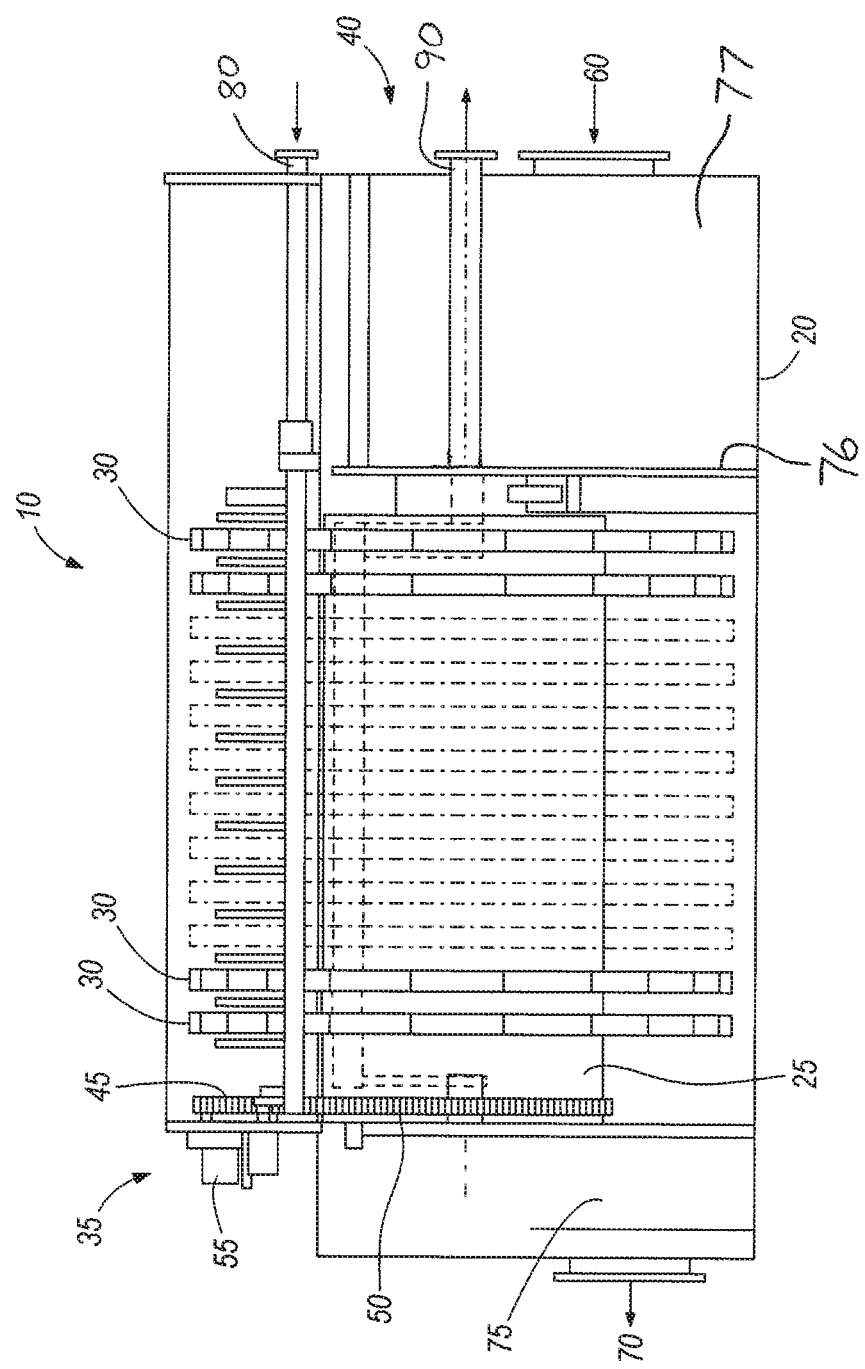
FIG. 2 is a broken away side view of the disc filter of FIG. 1.

The flow system 40, better illustrated in FIG. 2, includes an influent pipe 60 that directs influent into an interior 65 (Shown in FIG. 9) of the drum 25, an effluent pipe 70 that directs filtered fluid from a chamber 75 defined within the housing 20 out of the filter 10. A spray water pipe 80 provides high-pressure water to a spray system 85 (shown in FIGS. 5 and 13) that is periodically used to clean the filter media 15. A backwash pipe 90 transports the spray water after use and directs it out of the disc filter 10.

The disc filter 10 of FIGS. 1 and 2 employs a plurality of discs 30 to increase the overall filter area. The number and size of the discs 30 can be varied depending on the flow requirements of the system. For example, additional discs 30 can be attached to the drum 25 to increase the capacity of the filter system 10 without having to pass additional flow through any of the already existing discs 30.

FIGS. 3 and 18-20 illustrate one possible drum 25 that is suitable for use with the invention. The illustrated drum 25 includes an outer surface 95 and two end surfaces 100 that cooperate to define the interior space 65. One end is open to permit flow and the other end is sealed against flow. Several fluid apertures 105 are arranged in a series of axial rows with each row including a number of apertures 105 that extend circumferentially around a portion of the outer surface 95. The illustrated fluid apertures 105 are rectangular with other shapes also being possible. Attachment apertures 110 are positioned on either side of each fluid aperture 105.

As illustrated in FIGS. 3 and 18-20, the outer surface 95 of the drum 25 is not cylindrical, but rather includes a number of flat planar surfaces 115 that contact one another to define a polygonal cross section. A circular cross section or other shape could be employed in the invention if desired.

Figure 4:
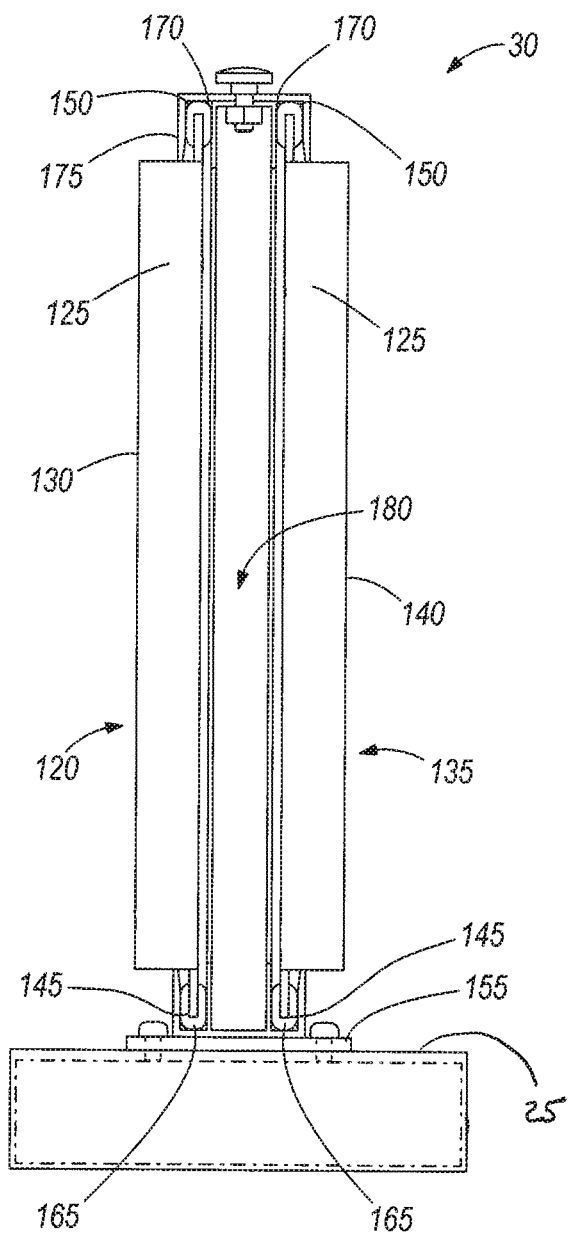
FIG. 4 is a broken away view of a portion of a disc of the disc filter of FIG. 1.
Figure 9:
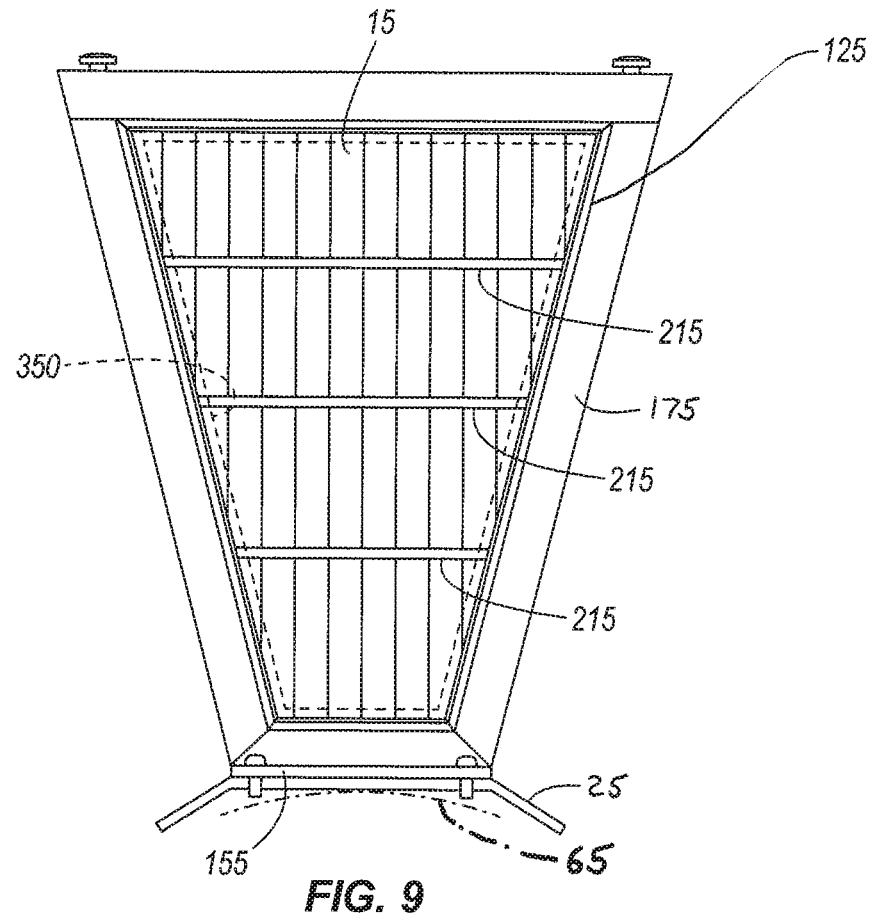
FIG. 9 is a front view of a filter panel in a support frame attached to the drum of the disc filter of FIG. 1.

FIG. 4 is a broken away view of a portion of a typical disc 30, and a cross section view of FIG. 9. The disc 30 includes a first set 120 of filter panels 125 that define a first annular surface 130 and a second set 135 of filter panels 125 that define a second annular surface 140. Each of the annular surfaces 130, 140 defines an inner diameter 145 and an outer diameter 150. The filter panel sets are mounted in a support structure attached to the drum 25. One of several attachment plates 155 engages the attachment apertures 110 around one or more of the fluid apertures 105 of the drum 25. The filter panel sets 125, 135 and the support structure in which they are mounted, including the cap 175, and the attachment plates 155 define a substantially enclosed space 180 that extends circumferentially around at least a portion of the drum 25. Fluid is able to pass from within the drum 25, through the fluid apertures 105 and apertures in the attachment plates 155 into the enclosed space 180, as will be discussed below. The perimeter of each filter panel receives a seal member for inhibiting leakage of water from the internal flow volume 180 around the edges of the panel 145, 150.

Figure 7:
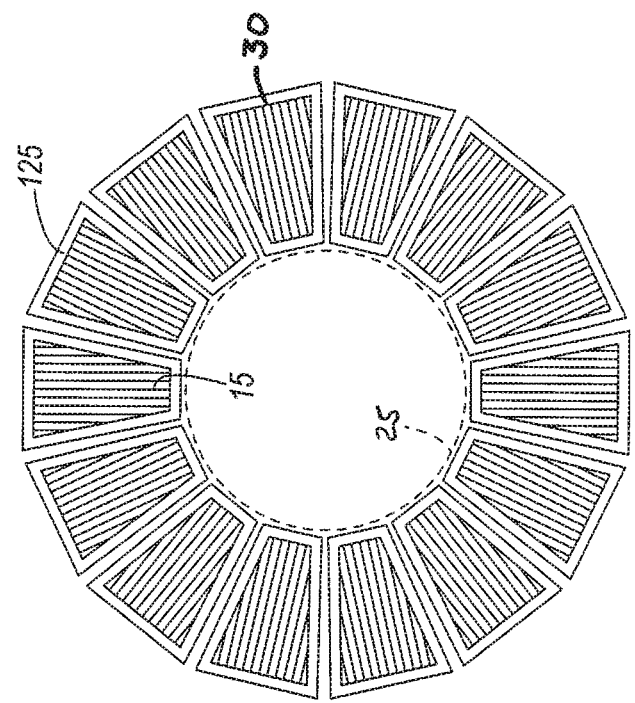
FIG. 7 is a schematic front view of a disc of the disc filter of FIG. 1.
Figure 8:
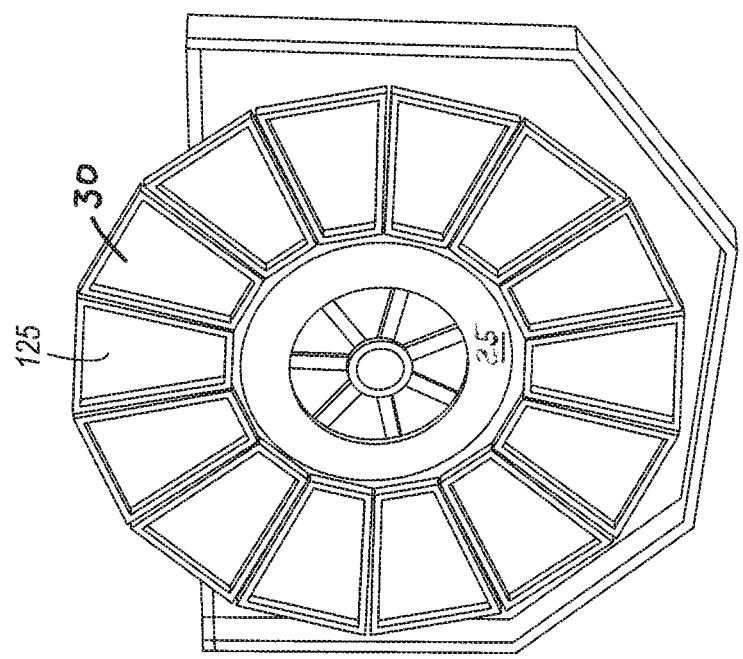
FIG. 8 is a perspective view of a disc of the disc filter of FIG. 1.

FIG. 5 schematically illustrates one of the discs 30 of FIGS. 1 and 2. The illustrated construction includes twelve filter panels 125 in each set 120, 135 (twenty-four total) to define the disc 30. However, other constructions may employ more filter panels 125 or fewer filter panels 125 as desired. For example, FIGS. 7 and 8 illustrate another arrangement in which fourteen filter panels 125 are used per set 120, 135 (twenty-eight total).

As illustrated in FIG. 6, the spray water pipe 80 extends the full length of the disc filter 10 and defines a distribution manifold 185. A spray bar 190 is positioned between adjacent discs 30 and at each end of the disc filter 10. A distribution pipe 195 extends between the manifold 185 and the spray bar 190 to provide for fluid communication of the high-pressure water to the spray bar 190. The spray bar 190 includes nozzles 200 that spray water onto the filter panels 125 to periodically clean the filter panels 125 as will be described in greater detail with reference to FIGS. 13 and 14.

A trough 205 is positioned beneath the spray bar 190 between adjacent discs 30 to catch the spray water or backwash, including any particulate matter removed from the filter panels 125. The backwash and particles are then removed from the system 10 via the backwash pipe 90.

Figure 10:
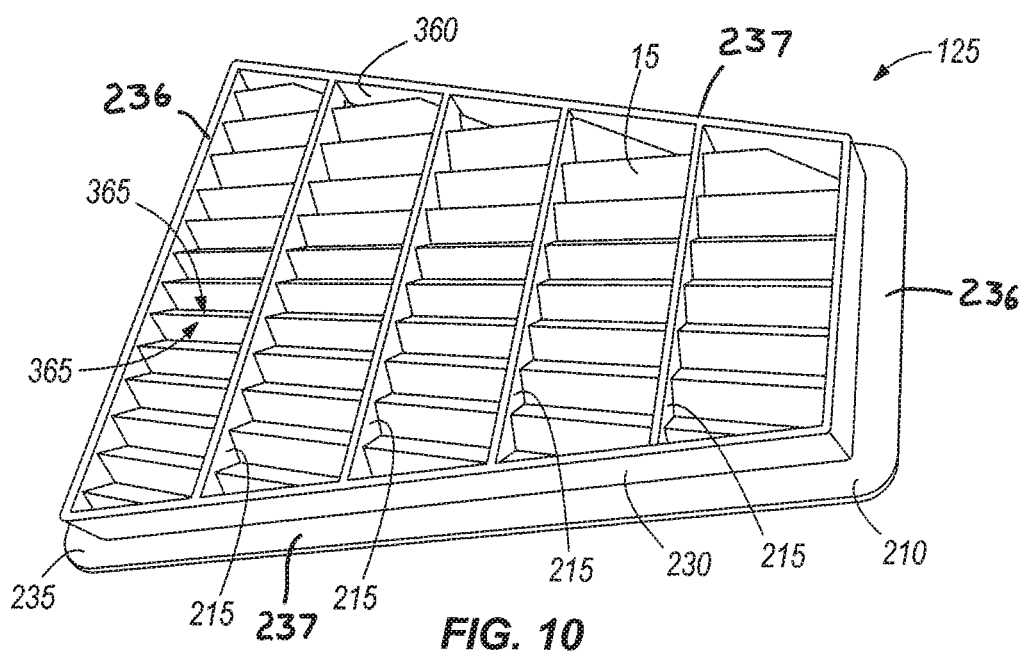
FIG. 10 is a perspective view of the filter panel of FIG. 9.

FIGS. 9 and 10 illustrate one possible arrangement of the filter panels 125. FIG. 9 illustrates the panel 125 mounted in its support structure (see also FIG. 4). FIG. 10 illustrates a pleated panel. The illustrated filter panels 125 include a pleated filter media 15, a perimeter frame 210, and several support gussets or stringers 215. In most constructions, the gussets 215 are molded as an integral part of the frame 210 with other attachment means also being suitable for use. In preferred constructions, the pleated filter media 15 is formed from a single piece of material that is sized and shaped to fit within the perimeter frame 210. In the illustrated constructions, the pleats extend in a substantially radial direction with other orientations also being possible. In one construction, a stainless steel screen is employed as the filter media 15. Other constructions may employ woven polyester, cloth, or other materials. The materials used and the size of the openings are chosen based on the likely contaminates in the effluent, the flow rate of the effluent, as well as other factors. In preferred constructions, the openings are between about 10 and 20 microns with smaller and larger openings also being possible.

The cap 175 is preferably formed from extruded aluminum with other materials (e.g., plastic, stainless steel, etc.) and other construction methods (e.g., injection molding, forging, casting, etc.) also being possible. In the illustrated construction, straight extruded portions are welded together to define the cap 175.

FIGS. 11 and 21-24 illustrates another arrangement of a filter panel 125 that includes a one-piece pleated filter media disposed within a frame 210. The construction of FIGS. 11 and 21-24 is similar to the construction of FIGS. 9 and 10 but also includes reinforced cross bracing 220 and peak stiffening members or ridge bars 225. In general, the ridge bars 225 and the stringers 215 cooperate to subdivide the filter media into a plurality of smaller cells. The cells are preferably sized as will be discussed below.

Before proceeding, it should be noted that stringers 215, cross braces 20, and ridge bars 225 are simply reinforcing members that aid in maintaining the pleated shape of the pleated filter media. Other reinforcing members or arrangements of the reinforcing members described herein could be employed if desired, so long as they aid in maintaining the pleated shape of the filter media.

As illustrated in FIG. 21, one construction of the frame 210 is formed with a cross section of an angled member that includes a flow-parallel leg 230 and a flow-transverse leg 235. The flow-transverse leg 235 receives the respective inner diameter seal 165 and outer diameter seal 170, as illustrated in FIG. 4, and provides additional stiffness to the flow-parallel legs 230. The flow-parallel legs 230 are sized to substantially match the peak-to-peak height of the pleated filter media 15. The frame 210 includes two substantially parallel sides 236 and two non-parallel sides 237 that are arranged such that they are substantially radial with respect to the drum 25.

To further stiffen the filter media 15, a series of stringers 215 extend across the opening in the frame. The stringers 215 include saw tooth cuts 238, illustrated in FIG. 23 that fit within the pleats to aid in holding the pleated filter media 15 in the desired shape. The construction of FIG. 9 includes three stringers 215 while the constructions of FIGS. 10 and 11 include four stringers 215. In most constructions, the stringers 215 are molded as an integral part of frame 210 with other attachment means also being suitable for use.

As illustrated in FIG. 23, the stringers 215 are generally located on both sides of the pleated filter media 15 such that the media 15 is sandwiched between two opposite stringers 215. This arrangement aids in holding the pleated filter media 15 in place during normal filtering operation as well as during backwashing.

As mentioned, the construction of FIG. 11 includes additional ridge bars 225 that are coupled to the peaks and/or the valleys of the pleats. As illustrated in FIG. 22, plastic can be molded to the peaks and valleys to define the ridge bars 225 and further stiffen the media 15. Alternatively, metal wires or rods of metal, fiberglass-reinforced plastic, or other material of sufficient stiffness can be positioned to maintain the shape of the peaks and the valleys.

In still other constructions, reinforced cross bracing 220, such as that illustrated in FIG. 24 can be employed to further stiffen the pleated filter media 15. Again, molded plastic may be employed as cross bracing 220. Additionally, metal wire or bars may be welded, brazed, or otherwise attached to the pleated filter media 15 as cross bracing 220.

In still other constructions, two pleated filter media 15 pieces are positioned in a back to back relationship such that they provide support for one another.

Figure 17:
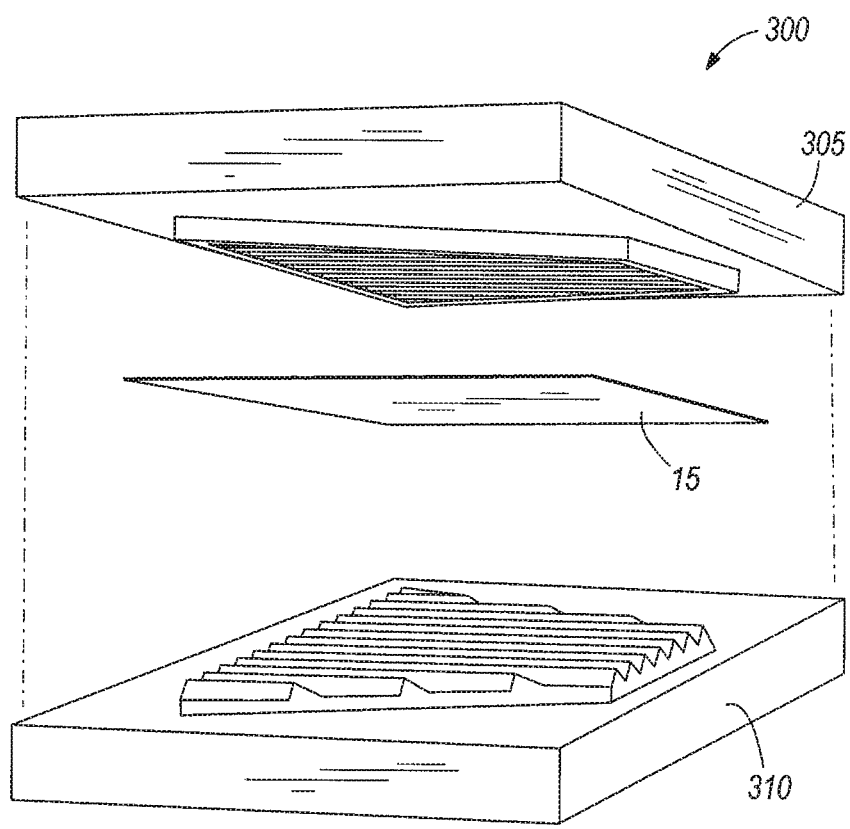
FIG. 17 is a perspective view of a mold configured to form a filter panel.

In another construction, the filter panels 125 are molded using a plastic material in conjunction with a filter media 15 or filter member. In this construction, a substantially planar sheet of the filter media 15 is placed in a mold 300 (shown in FIG. 17). The mold 300 includes a first half 305 and a second half 310 that close over the filter media 15 and create the pleats in the media 15. A plastic material is then injected into the mold 300 to form the perimeter frame 210, the stringers 215, and the ridge bars 225. Thus, the perimeter frame 210, the stringers 215, and the ridge bars 225 are integrally formed as a single piece or component around the filter media 15. The edges of the filter media 15 are embedded in the perimeter frame 210, the ridge bars 225 are adjacent to or molded around the peaks and valleys of the pleats, and the stringers 215 are formed with saw tooths that engage the pleats. The pleats of the filter media 15 are sandwiched between the saw tooths of the stringers 215.

Figure 12:
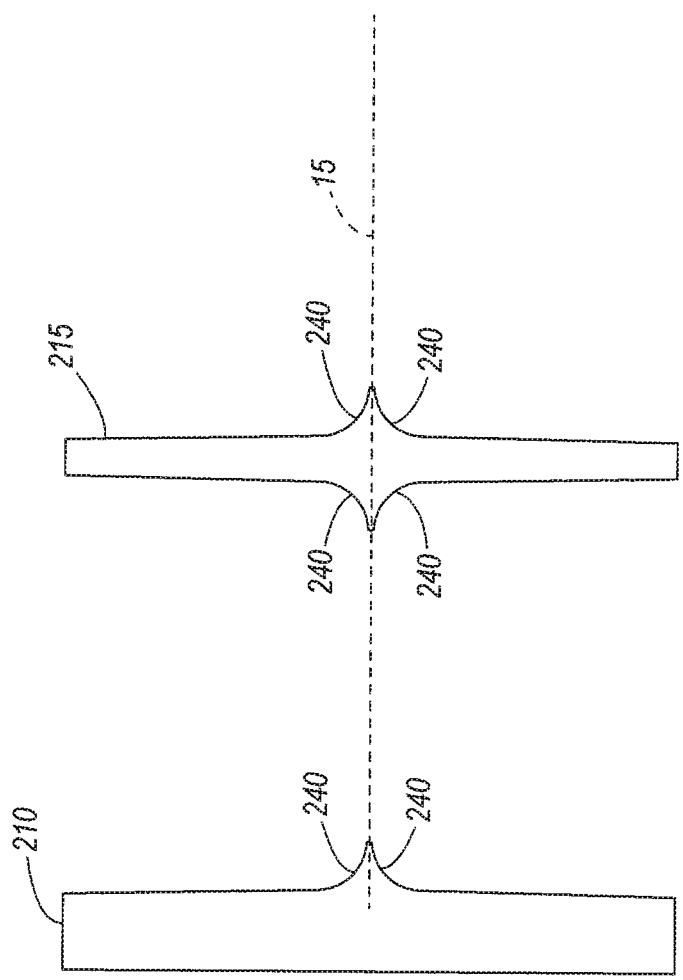
FIG. 12 is a schematic illustration of a feathered frame and a feathered stringer supporting a pleated filter media.

In some constructions, feathering 240 may be employed at some or all of the interfaces to reduce fatigue and improve the overall life of the pleated filter media 15. FIG. 12 illustrates a feathered frame 210a and a feathered stringer 215a adjacent the frame 210a. The feathering 240 provides additional surface area contact between the feathered component (e.g., frame, stringer, etc.) and the pleated filter media 15. While this can reduce the overall fatigue damage that may occur, and thus may extend the operational life of the pleated filter media 15, the feathering 240, as well as the use of additional stringers 215, ridge bars 225, and reinforced cross bracing 220 has the disadvantage of reducing the overall flow area for a given frame size.

Figure 13:
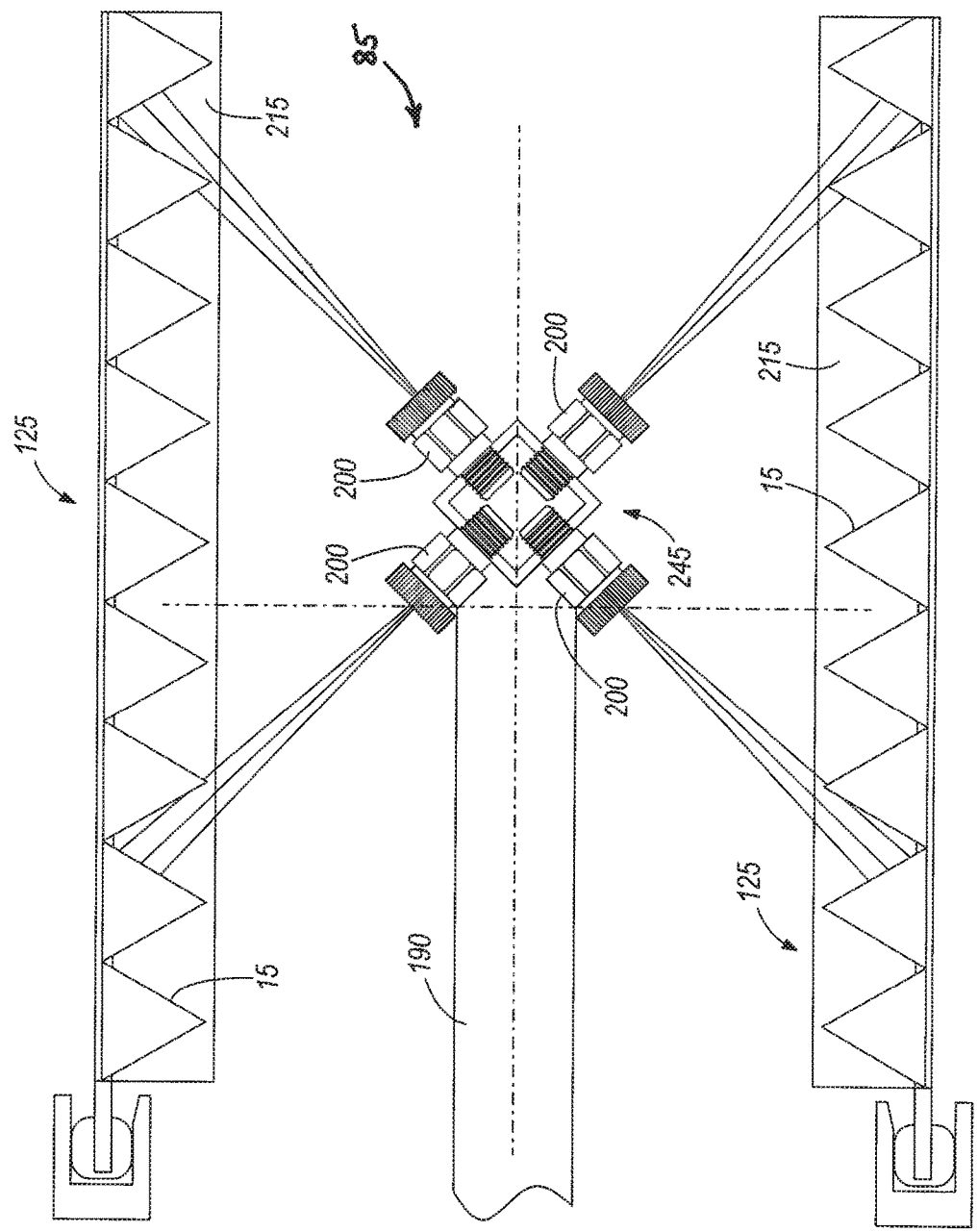
FIG. 13 is a schematic view of a backwash nozzle arrangement disposed between two adjacent discs of the disc filter of FIG. 1.

FIG. 13 illustrates one possible arrangement of nozzles 200 on a spray bar 190. As discussed, spray bars 190 are positioned between adjacent discs 30 and at the ends of the filter system 10 such that they can spray high-pressure water in a reverse flow direction through the pleated filter media 15 to complete a backwash. Because the filter media 15 is pleated and thus angled with respect to the plane of the discs 30, the use of nozzles 200 that are similarly angled provides for more efficient backwash cycles. Thus, the nozzles 200 are angled about 45 degrees off of a normal direction to the planes of the discs 30. In addition, two nozzles 200 are provided at each spray point 244 (see FIG. 14) with the nozzles 200 angled with respect to one another at about 90 degrees such that both sides of the pleats are sprayed directly during the backwashing. Surprisingly, a straight on direct spray may be utilized. In addition, spray bouncing off the filter media at an angle improves the cleaning effect and efficiency for a given amount of backwash flow and spray velocity.

Figure 14:
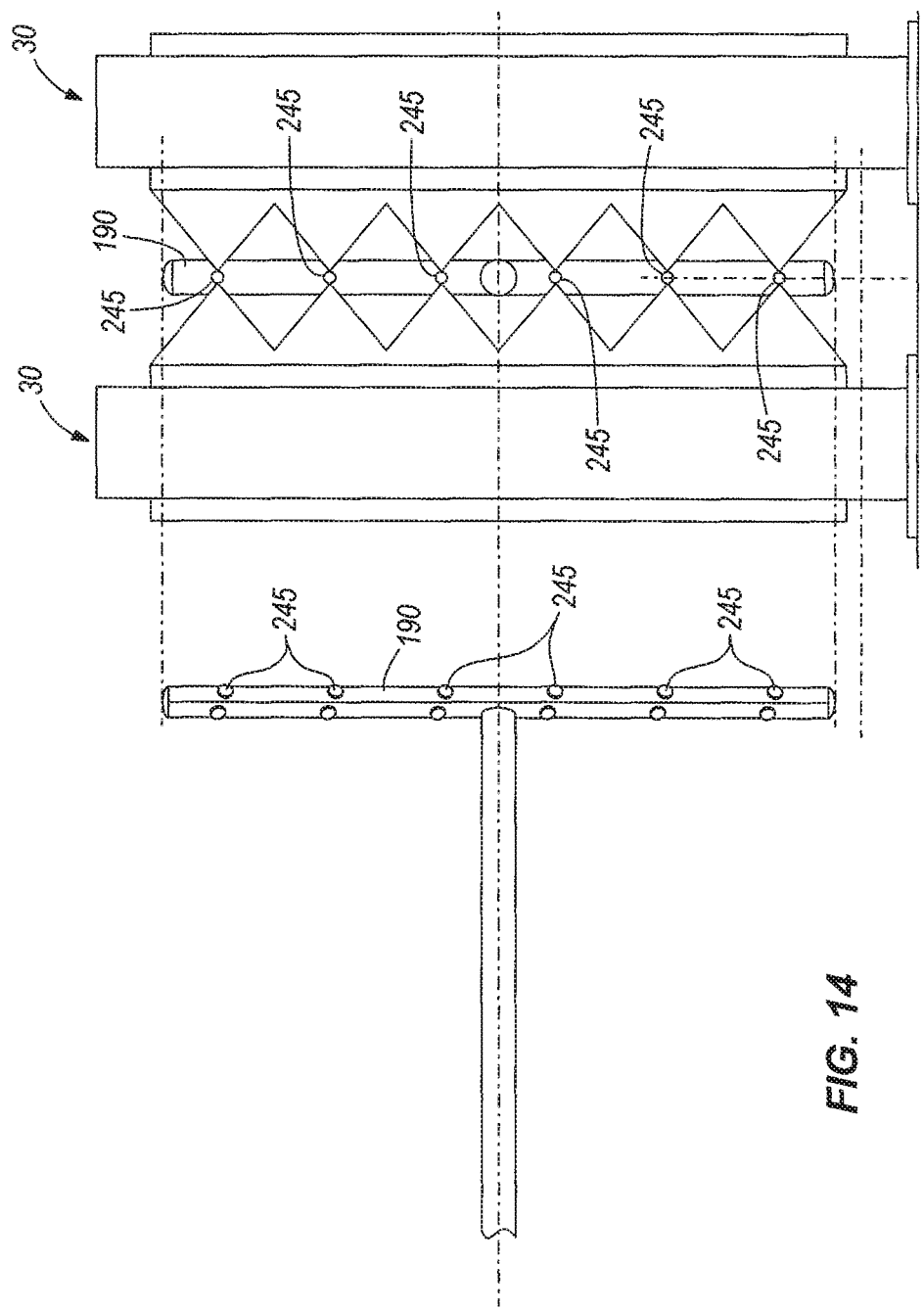
FIG. 14 is a side schematic view of the backwash spray bar arrangement of FIG. 13.
Figure 15:
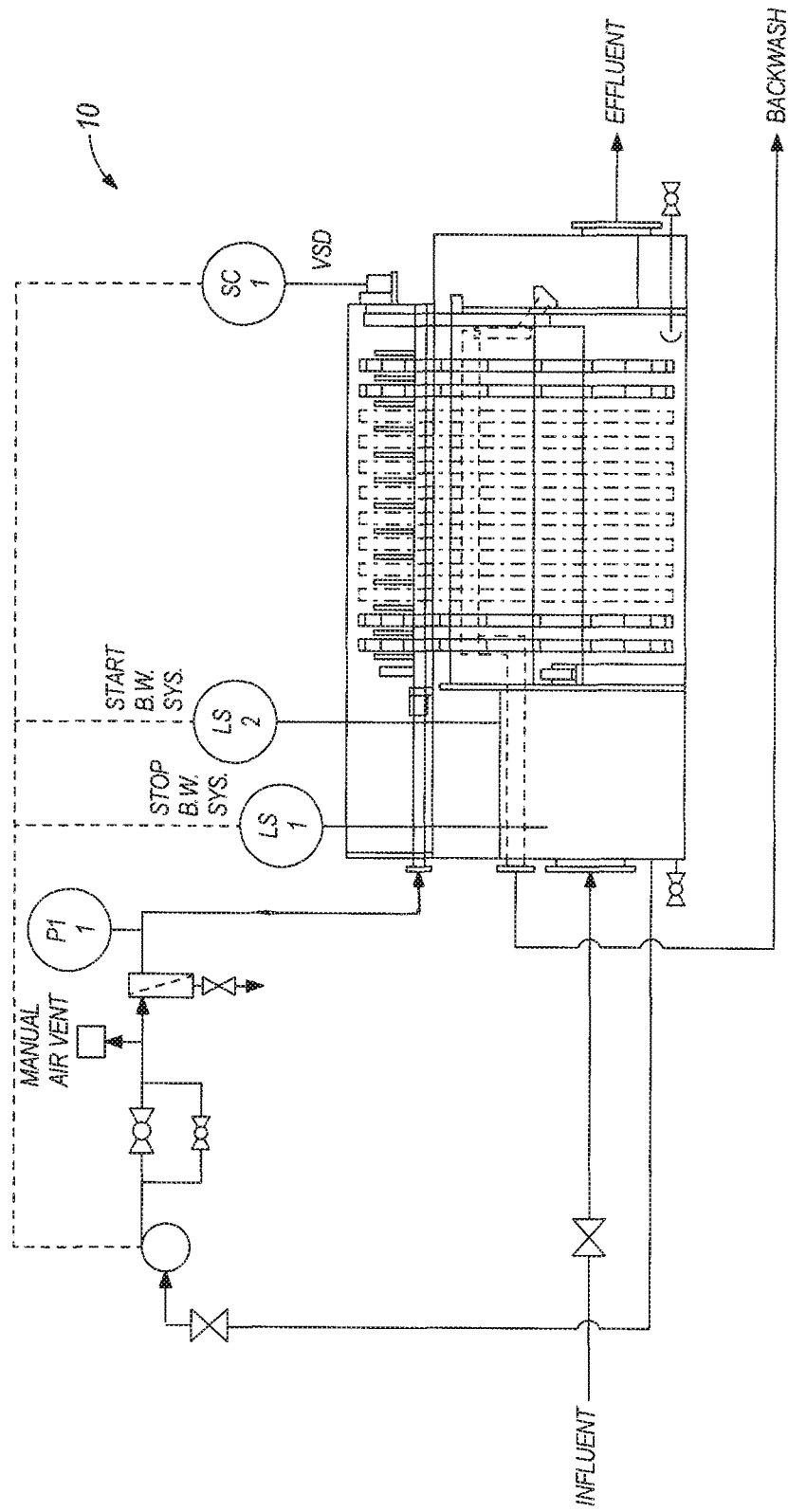
FIG. 15 a schematic illustration of a piping and controls arrangement for the disc filter of FIG. 1.
Figure 16:
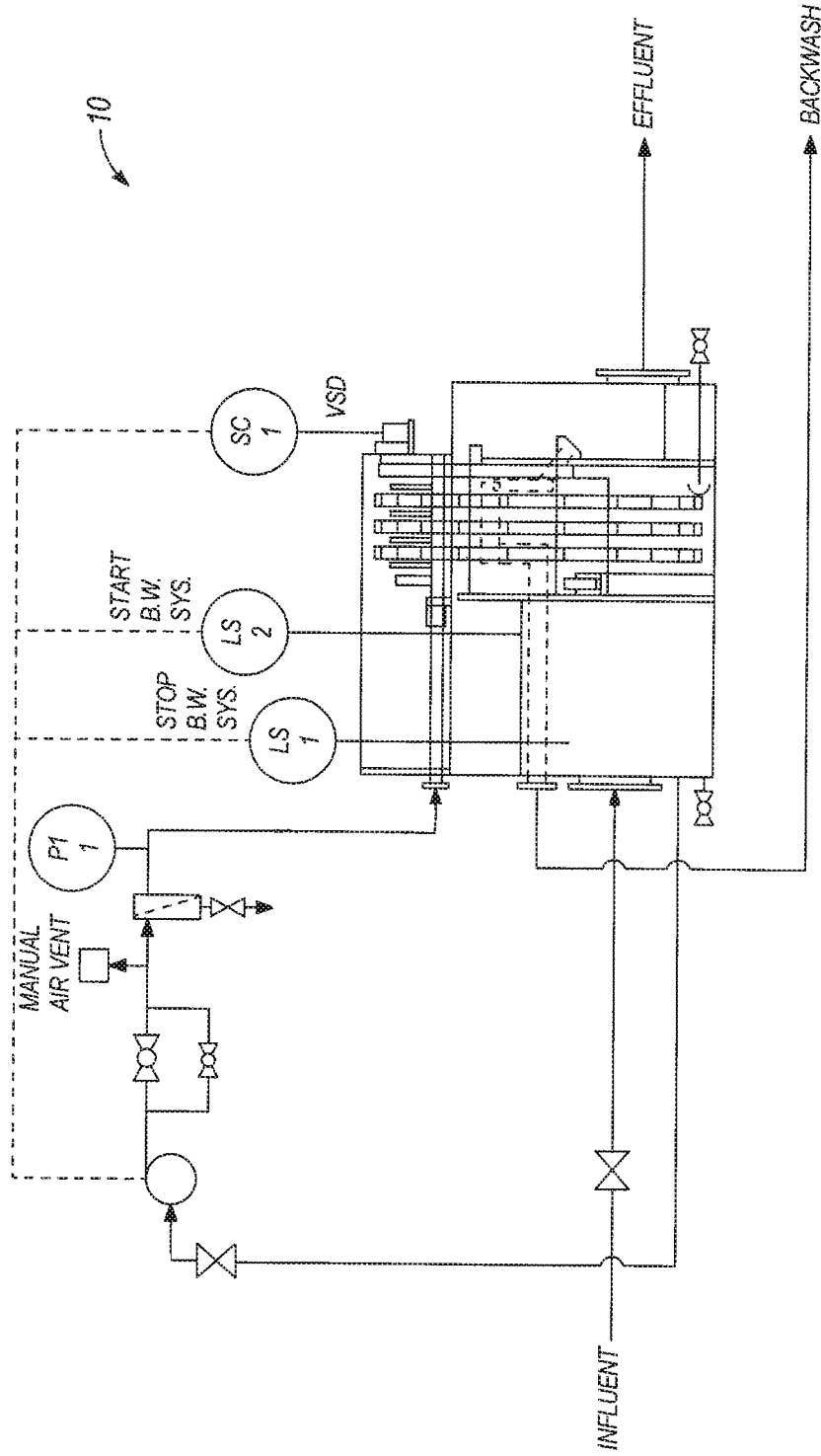
FIG. 16 is another schematic illustration of a piping and controls arrangement for the disc filter of FIG. 1.

As illustrated in FIG. 14, each spray bar 190 may include multiple spray points 244 with four nozzles 200 supported at each spray point 244. In the construction illustrated in FIG. 14, six spray points 244 are employed with more or fewer points being possible. As the discs 30 rotate, the nozzles 200 direct high-pressure water onto the pleated filter media 15 and clean the media 15. It should be noted that the end-most spray bars 190 only require two nozzles 200 per spray point 244 as they are not disposed between two adjacent discs 30.

Figure 30:
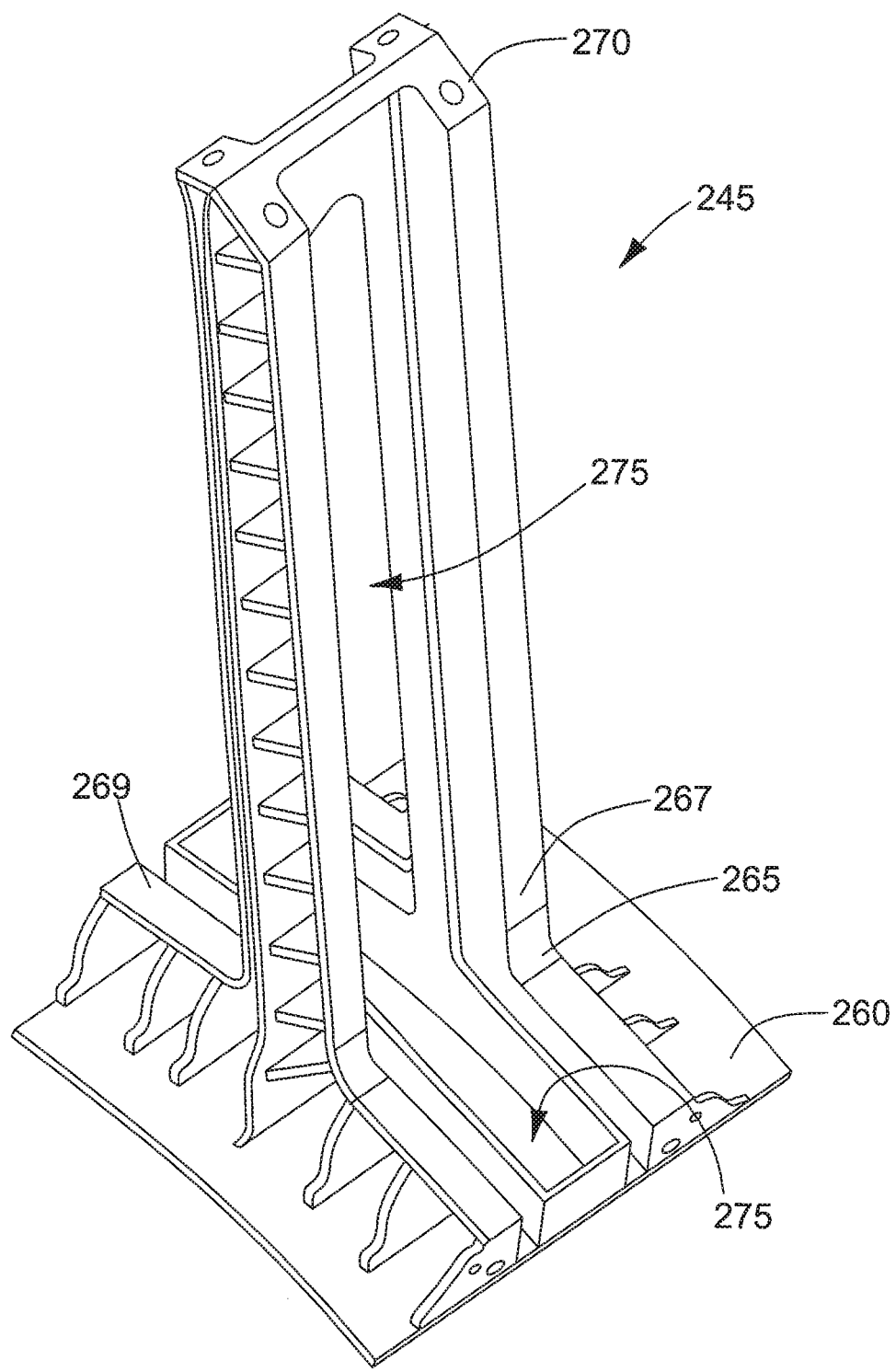
FIG. 30 is a perspective view of a filter support.

Referring to FIG. 30, a filter support 245 in accordance with the present invention is shown. The filter support serves to support a portion of a side 255 and bottom portion 250 of a pair of filter panels 125. The filter support 245 includes an attachment portion 260 and a transversely oriented strut portion 270. The attachment portion 260 includes a first section 265 which extends from an end 267 of the strut portion 270. The attachment portion 260 also includes a second section 269 which extends from the end 267 in a direction opposite to the first section 265 to thus form an inverted T-shaped filter support 245. The filter support 245 further includes a single aperture 275 which extends along the strut portion 270 and the first 265 and second 269 sections of the attachment portion 260 to thus form a substantially inverted T-shaped aperture which corresponds to the shape of the filter support 245.

Figure 31:
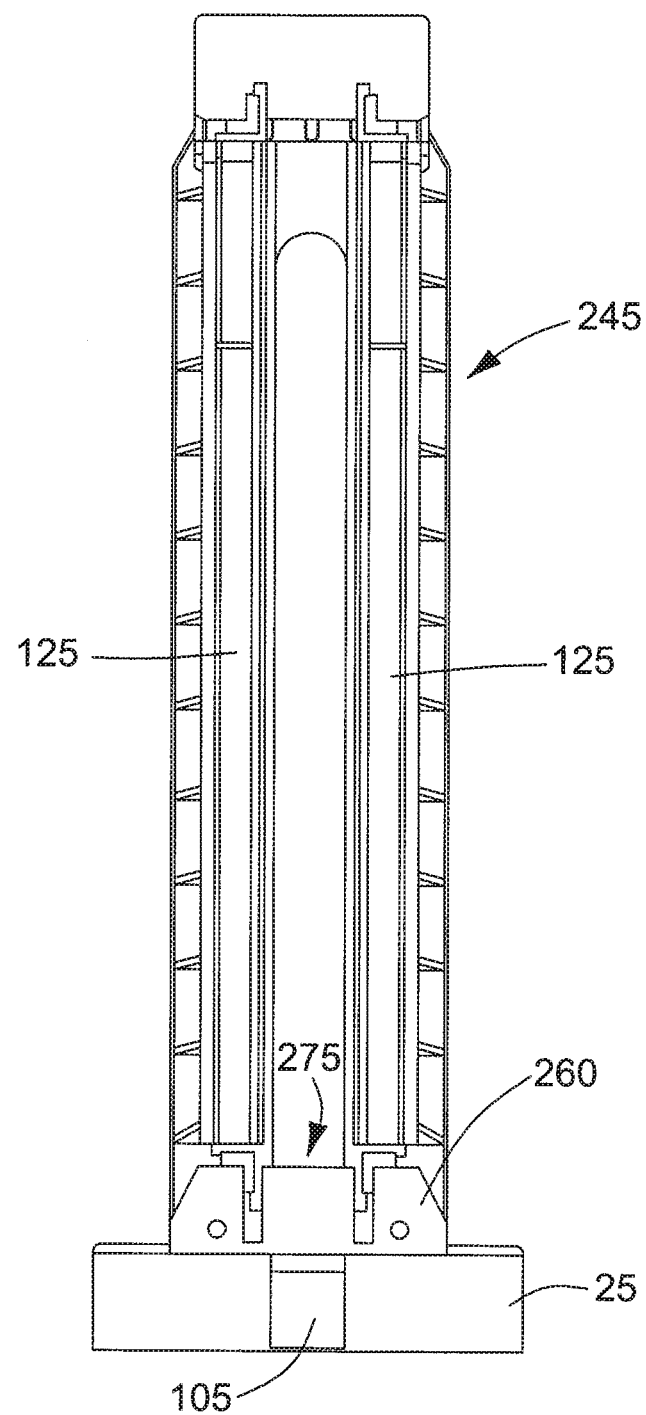
FIG. 31 is an end view of the filter support of FIG. 30 attached to a drum.

Referring to FIG. 31, the filter support 245 is shown positioned on the drum 25. The attachment portion 260 is designed to be maintained in alignment with fluid aperture 105 such that the aperture 275 is in fluid communication with an associated fluid aperture 105 in the drum 25. The aperture 275 is substantially the same size or larger than the fluid aperture 105. In another embodiment, the filter support 245 is positioned on the drum 25 such that the attachment portion 260 straddles a support section of the drum 25 located in between adjacent fluid apertures 105. In this embodiment, portions of two adjacent fluid apertures 105 are in fluid communication with the aperture 275

Figure 35:
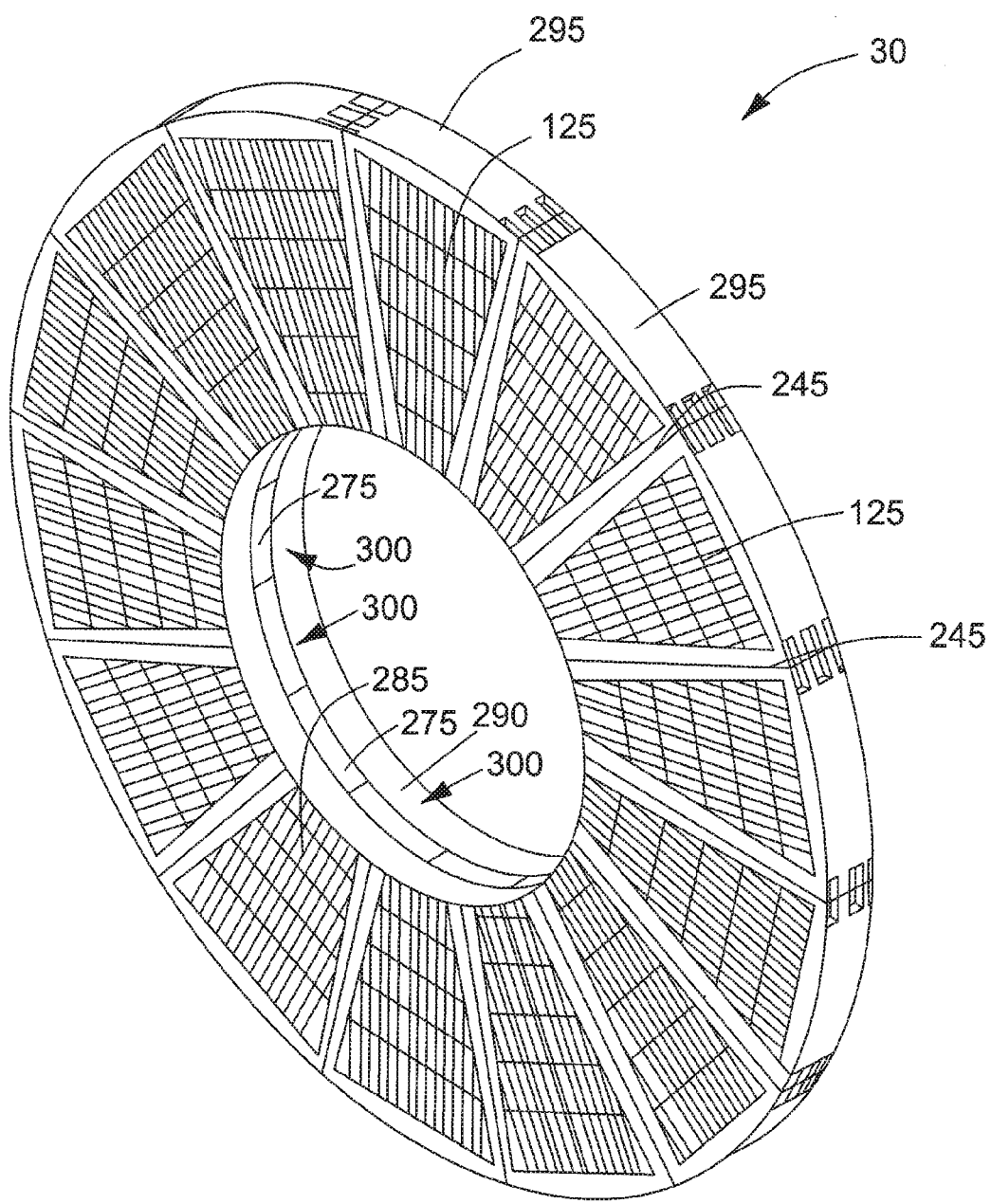
FIG. 35 is a perspective view of a disc including a number of filter panels.

A pair of filter panels 125 is shown installed in the filter support 245. The filter panels 125 are spaced apart from each other. As illustrated in FIG. 35, the disc 30 includes a first set 285 of filter panels 125 and a second set 290 of filter panels 125.

Figure 32:
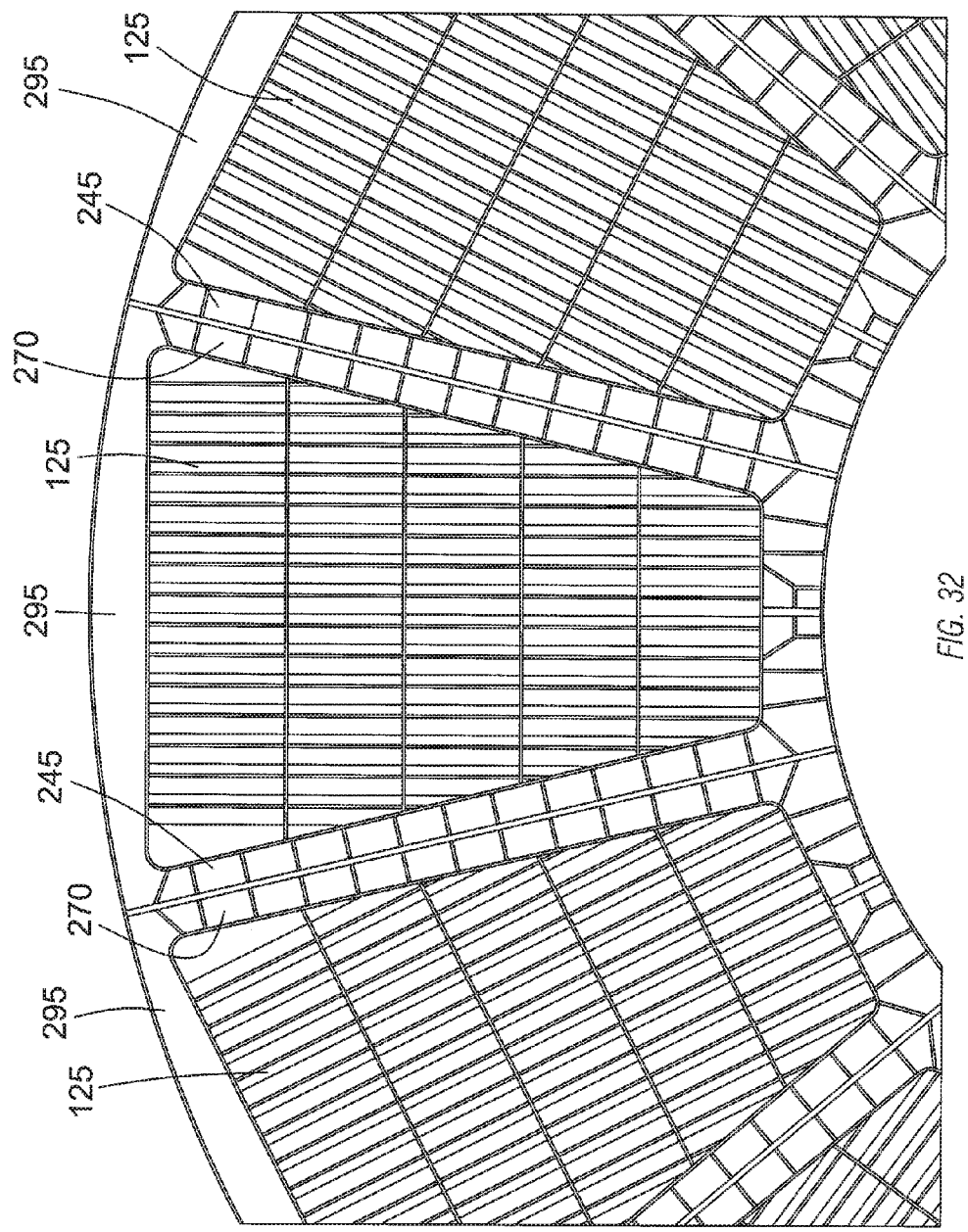
FIG. 32 is an end view of a disc including several filter panels and filter supports.

Referring to FIG. 32, a side view of a plurality of filter supports 245 and filter panels 125 is shown. A cap 295 is used to secure each pair of filter panels 125. Each cap 295 is removably secured to adjacent radial struts 270 to enable removal of each filter panel 125 for cleaning or replacement as necessary. Each filter panel pair and associated cap 295 form a pocket shaped filter segment 300 (shown in FIG. 35) for receiving contaminated water. Referring back to FIGS. 30 and 31 in conjunction with FIG. 32, the aperture 275 enables fluid communication between the fluid aperture 105 and adjacent filter segments 300. This enables water and air to flow circumferentially between adjacent filter segments 300 as the drum 25 rotates, thus resulting in an increase in capacity of the disc filter 10.

Water to be filtered enters the filter segment 300 through the fluid aperture 105 and the aperture 275. The water in the filter segment 300 is then filtered through the filter panels 125 to provide filtered water. The aperture 275 is of sufficient size relative to the fluid aperture 105 such that trash or other debris which flows through the fluid aperture 105 is not captured by the radial strut 270. In one embodiment, the aperture 275 is substantially equal in size to the fluid aperture 105. In another embodiment, the aperture 275 is sized larger than the fluid aperture 105. As a result, the amount of trash collected by the radial strut 270 is substantially reduced or eliminated, resulting in relatively unimpeded flow of water and air between filter segments 300 as the drum 25 rotates. This design feature minimizes water turbulence from water inertia and prevents air entrapment and subsequent release so that the undesirable wash off of solids already filtered from the water is substantially reduced. The radial strut 270 further includes ribs 305 which provide structural support.

Figure 33:
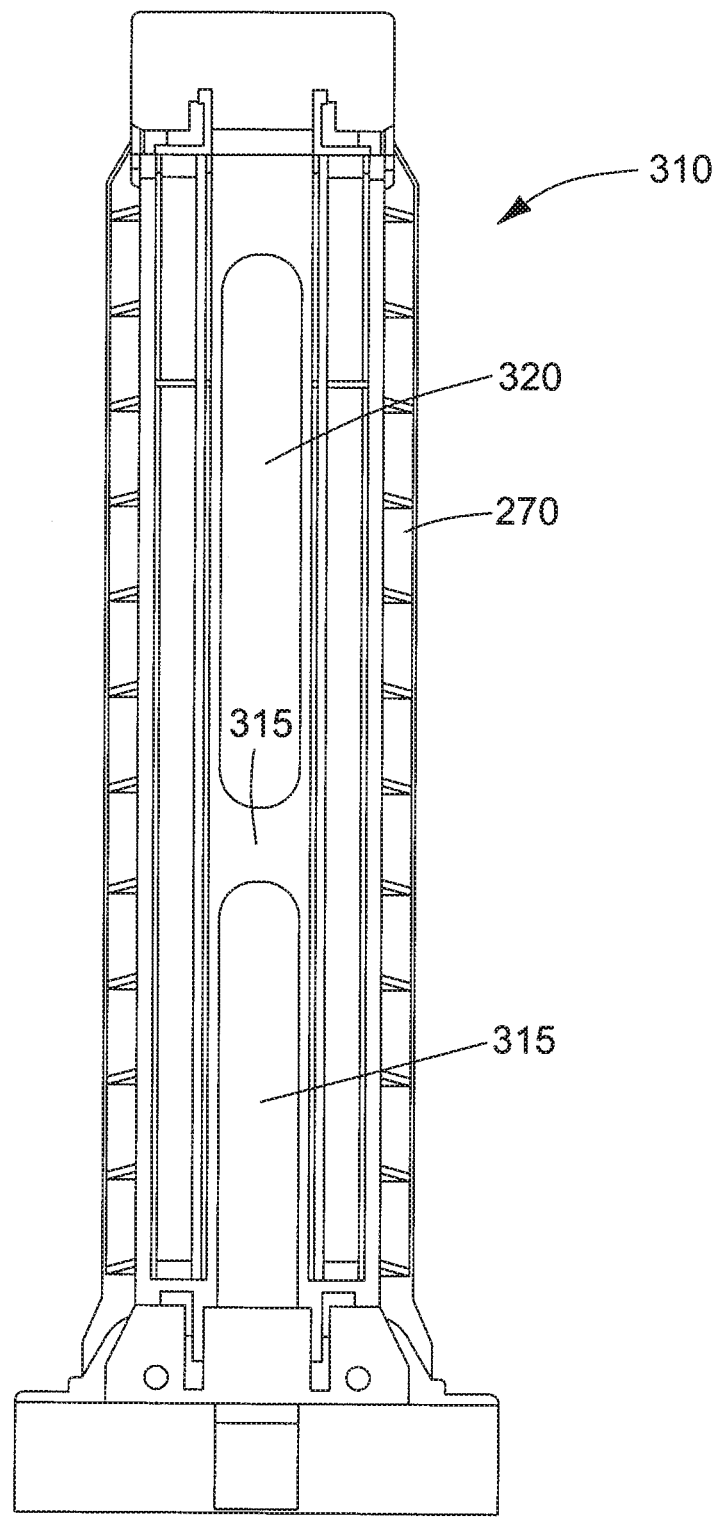
FIG. 33 is an end view of another filter support attached to a drum.

Referring to FIG. 33, a filter support 310 is shown wherein the radial strut 270 includes a gusset 315 which provides additional structural support. The filter support 310 includes first 315 and second 320 fluid channels whose total area is substantially equal in size to the fluid aperture 105. This results in the elimination or reduction in the amount of trash that is collected by the radial strut 270 as described above. The filter supports 245, 310 result in a larger fluid channel area relative to that of conventional filter supports. This reduces the amount of material necessary to manufacture the filter supports 245, 310, thereby resulting in reduced manufacturing costs. It has been determined through calculation that the structural integrity of the embodiments shown herein are acceptable when designing for a head loss of as much as 24 inches of water or even higher.

As previously described, the disc filter 10 may use filter panels 125 which are pleated, although it is understood that other types of panels may be used. An advantage with using pleated filter media 15 is that both the media pleats themselves, as well as the panel perimeter sidewalls such as those along the radial sides of the pleated panel 125, provide temporarily horizontal surfaces to which trash can cling more readily. As a result, rotating shelves are formed while submerged which are oriented at a favorable angle with respect to gravity until the trash is over the trough for eventual deposit thereon.

Figure 34:
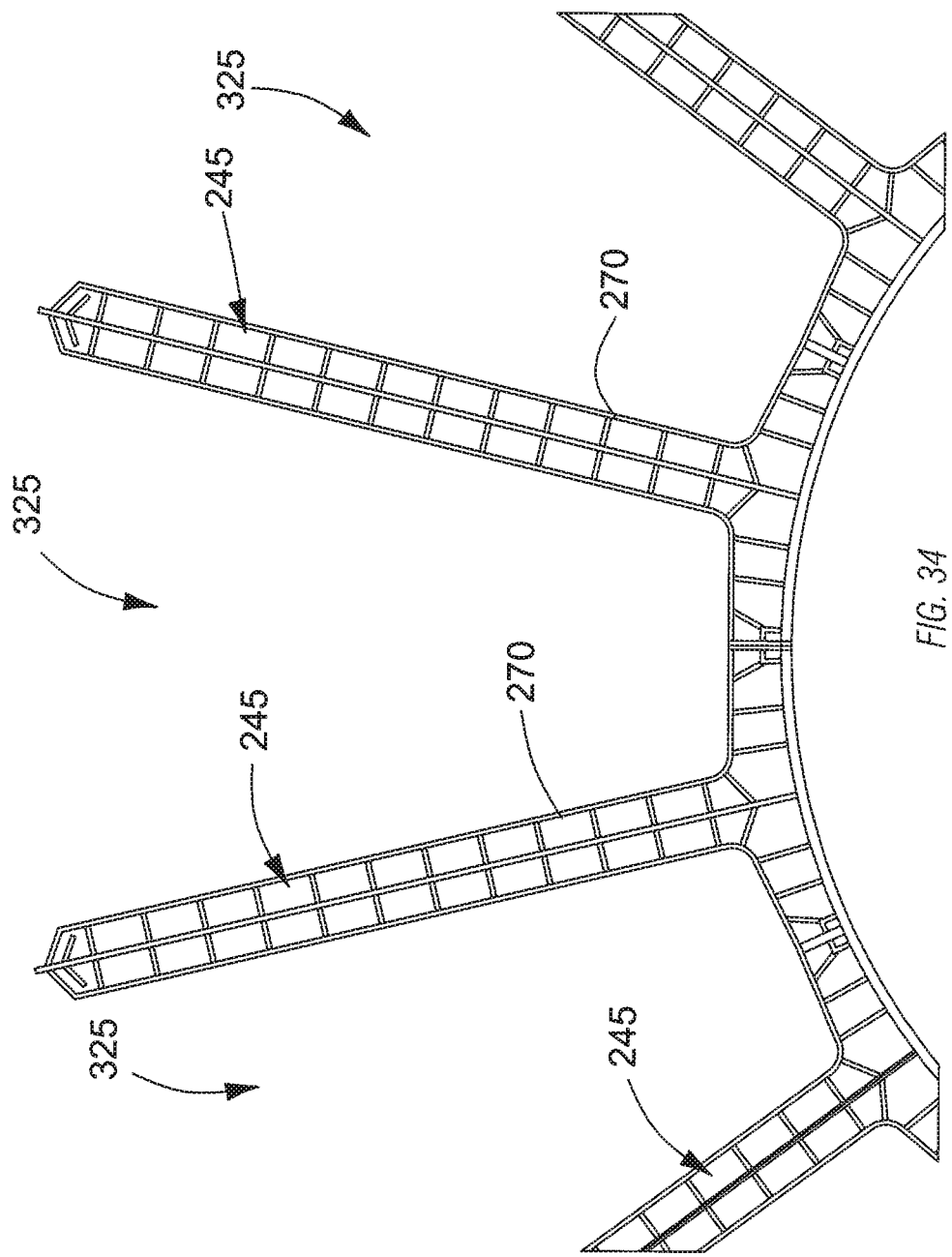
FIG. 34 is an end view of several filter supports attached to one another.

Referring to FIG. 34, a plurality of filter supports 245 is shown assembled. The radial struts 270 extend outwardly from the drum 25 and are spaced apart from each other to form spaces 325 each of which is adapted to receive a filter panel 125. Referring to FIG. 35, a view of the disc 30 is shown depicting filter supports 245, filter panels 125 and caps 295 in accordance with the present invention. In this configuration, the first 285 and second 290 sets of filter panels each include fourteen filter panels 125 (twenty eight total).

In prior designs, seating of the panels is a two-step process. First, the filter panel with edge seal is slid down into the edge channels of a filter support. Then the cap is slid into place against the top edge gasket. During the both steps, sliding friction develops between the channel walls and the gasket. During the first step, the maximum panel seating force required can rise to a very large value unless a design compromise is made. Along the angled sides 255 of the trapezoidal panel, the friction force direction is opposite to the gasket insertion path, but is at a significantly oblique angle to the long direction of the gasket. Hence, the risk of sideways stretching or potentially distorting movement of the gasket relative to its original position and shape is high. Such distortion may result in leakage. In particular, the gasket can seal against higher pressure if under a higher compression force, but high compression force raises the risk of leakage due to distortion or stretching of the gasket during insertion into the angled side channels of a conventional design.

The friction associated with gasket sliding in a filter support structure design having sidewall channels demands a compromise between reasonable insertion force and adequate compression of the gasket. Lower gasket compression results in lower sliding friction, but also reduces the pressure threshold for leakage. Conventional systems attempt to overcome this problem by "flocking" the outside sliding surfaces of the rubber gasket. While this helps, it does not eliminate the inherent problem.

In a preferred embodiment, a bottom channel is used. Since the bottom channel is relatively short the insertion force remains very low, even for reasonably high gasket compression. The likelihood of sideways stretching or potentially-distorting movement of the gasket due to oblique friction forces is substantially reduced for a bottom channel.

Figure 26:
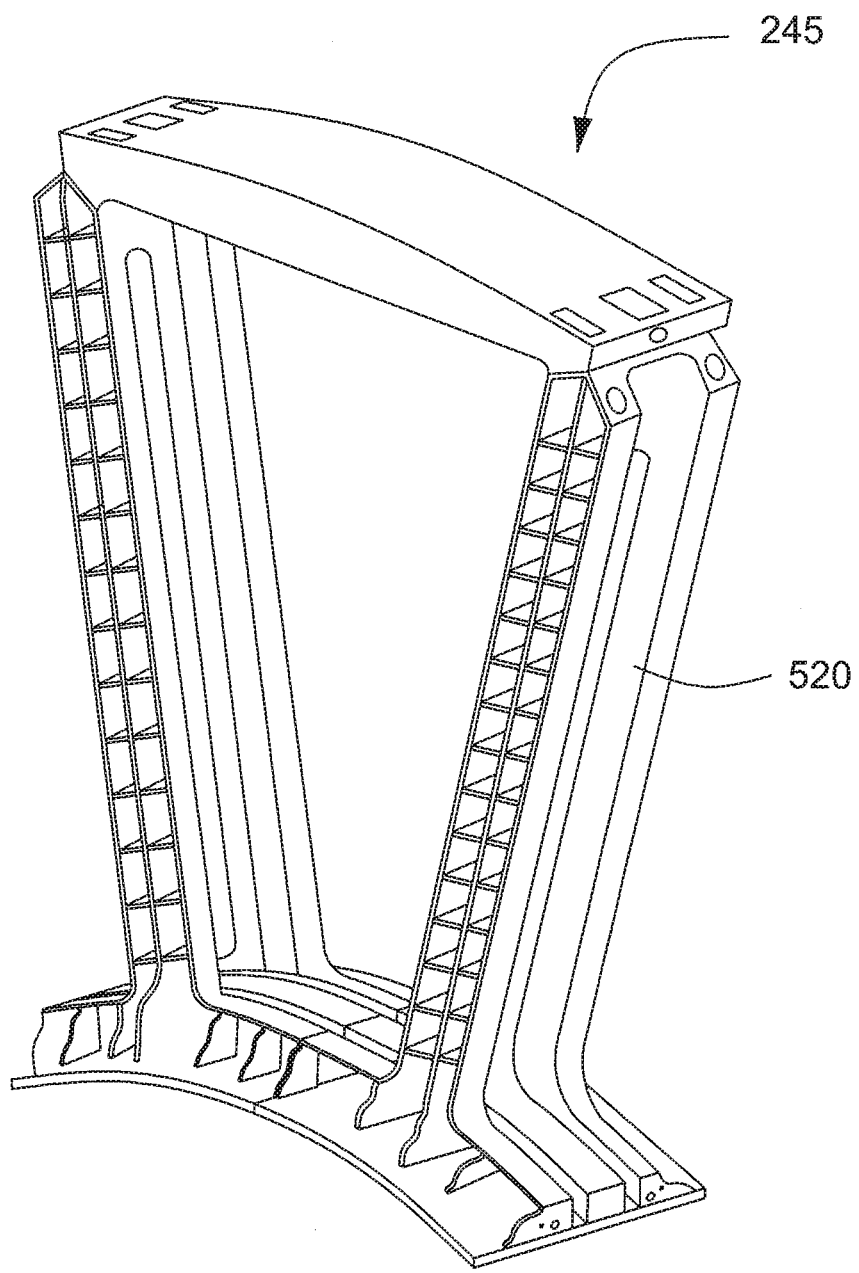
FIG. 26 is a perspective view of a filter support box.

To assemble a filter panel 125, a molded gasket 500 that is slightly undersized is stretched around the outside of the filter panel 125 to create a gasketed panel 505 as illustrated in FIGS. 27 and 28. The tension on the gasket 500 serves to hold the gasket 500 in position. However, some constructions may employ a sealing/retention aid such as silicone rubber or silicone grease. The bottom of the gasketed panel 505 is then inserted into a filter panel receiving space such as a slot or bottom channel 510 of the filter support 245 (shown in FIG. 26) and is pushed downward. The top of the gasketed panel 505 is then pushed forward (tilted) to lock the panel 125 in place.

Figure 29:
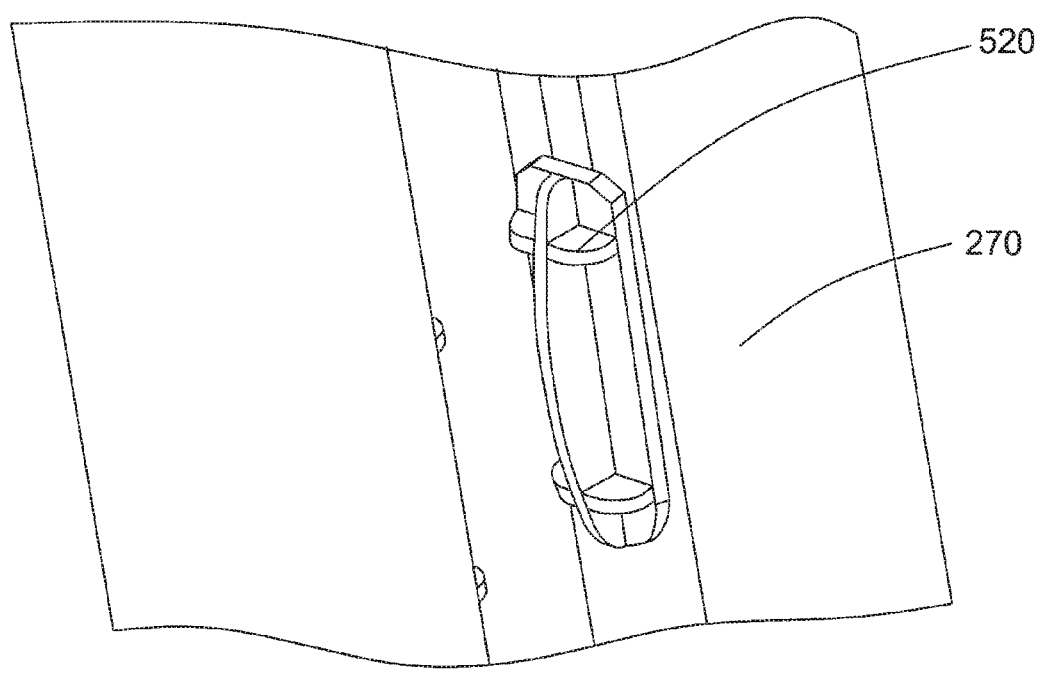
FIG. 29 is a perspective view of a snap lock feature.

In one embodiment, the filter support 245 includes a snap lock feature 520 (shown in FIG. 29) located about one quarter of the way from the top of the filter support 245. More specifically, the snap lock feature 520 is on the radial strut 270 on each inner wall 530 of the filter support 245. Each snap lock feature 520 holds two adjacent filter panels 505. The snap lock feature 520 is flexible, and is pushed out of the way as the panel 505 is tilted into place. It then snaps back to its original position, locking the panel 505 into the upright position. In this position (the operating position) a seal is formed completely around the perimeter of the filter panel 505 between the filter panel 505 and the panel support structure, which includes the filter support 245 and the cap 295.

To complete the installation of the gasketed panels 505, the cap 295 is positioned on top of the filter support structure and cap hardware 540 is installed. In preferred constructions, the cap hardware includes a nut and a bolt that connect the cap 295 to the adjacent cap 295. Each end of the cap 295 is connected to the adjacent cap 295 to define a complete ring of caps 295 around the outer perimeter of the disc 30.

In operation, water enters the disc filter 10 via the influent pipe 60. The contaminated influent water is separated from the clean filtered water using a wall 76 through which the drum is mounted with a rotating seal. The wall 76 forms an influent water chamber 77 and a clean water chamber 75. The influent enters the drum interior 65 and is distributed to the discs 30. The influent enters the disc 30 and flows out through the pleated filter media 15 in at least one of the filter panels 125. As the influent passes through the pleated filter media 15, particulates that are larger than the openings in the filter media 15 are retained within the discs 30. The effluent collects within the clean water chamber 75 outside of the discs 30 and exits the disc filter 10 via the effluent pipe 70. A system of weirs defines the effluent end of clean water chamber 75 and maintains the desired minimum liquid level in chamber 75 within the filter 10.

During operation, the drum 25 continuously or intermittently rotates such that filter panels 125 enter the liquid and filter influent only during a portion of the rotation. Since discs 30 are never fully submerged, filter panels 125 enter the liquid and are available for filtering influent only during the bottom portion of the rotation arc. After filtering, and during rotation of drum 25, the filter panels 125 exit the liquid and pass the spray bars 190. During a backwash cycle, high-pressure water is sprayed at the downstream surface of the filter panels 125 to clean them as the drum 25 rotates. The water droplet impact vibration and penetration of the filter media 15 by a portion of the water removes debris that is caught on the upstream surface of the pleated filter media 15. The debris and water are collected in the trough 205 and transported out of the filter system 10 by pipe 90. During backwashing, filtration can continue as some of the filter panels 125 are disposed within the liquid, while others are above the liquid and can be backwashed The filter panels 125 described herein provide for a greater flow area than prior art systems and are capable of operating at a substantially higher flow through a similar panel area. Specifically, the perimeter frame 210 defines a panel normal flow area 350, shown in FIG. 9 that is essentially the planar area within the perimeter frame 210. As one of ordinary skill will realize, the true flow area is less than this planar area as support members may extend across this area and block some of the flow area. However, this area is minimal and generally can be ignored. By forming pleats in the filter media, the flow area is greatly increased as the fluid (e.g., air, water) flows generally through the pleats in a direction 355 normal to the pleat, as illustrated in FIG. 10. Thus, the pleats define a media normal flow area 360 that is substantially greater than the panel normal flow area 350. Essentially, the media normal flow area 360 is the sum of the areas of the various pleats measured in a plane normal to the flow direction 365. In one construction, the media normal flow area 360 for each filter panel 125 is greater than one square foot (0.09 sq meters) with sizes greater than two square feet (0.19 sq meters) being preferred. Test data shows that this flow area provides for a flow rate through each filter panel in excess of about 7 gallons per minute (26.5 liters per minute). More specifically, each filter panel 125 is configured to pass a liquid flow therethrough. The liquid flow is in excess of 3 gallons per minute per square foot (11.4 liters per minute per 0.09 sq. feet) and is at a pressure differential across the filter media in excess of 12 inches of water (3 kPa).

In operation, the drum 25 is rotated and the water to be filtered is introduced into the drum 25. The water then exits through apertures 105 in the drum 25 and flows into the cavity inside the filter support 245. The water in the filter support 245 is then filtered through the media of the filter panels 125 to provide filtered water. The filtered water is then collected in a chamber and exits the disc filter through an effluent pipe. Particulates which are filtered out by the filter panels 125 remain within the cavity on the inside surface of the filter media of the filter panels 125. A spray device 85 is used to spray the panels 125 with water or other chemicals to dislodge the particulates and clean the filter media. The particulates are then collected in a trough and are removed from the disc filter system.

While the foregoing description should be read to include many variations of pleats, the following table illustrates the expected low end, the expected high end, and the expected nominal size of several parameters of the pleats. Of course variations in these parameters may be possible.

| Parameter | Low End | Nominal | High End |
| --- | --- | --- | --- |
| Cell size, in | 0.5 × 0.5 | 0.75 × 4 | 2 × 36 |
| (mm) | (12.7 × 12.7) | (19 × 102) | (51 × 914) |
| Pleat Height, inches | 0.1 | 1.0 | 6.0 |
| (mm) | (2.5) | (25.4) | (152) |
| Pleat Included Angle, degrees | 20 | 60 | 80 |

-continued

| Parameter | Low End | Nominal | High End |
|---|---|---|---|
| Velocity past Cleaning Nozzles ft/min (meters/min) | 1 (0.3) | 3 to 30 (0.9 to 9.1) | 50 (15.25) |
| Head loss, inches of water (meters of water) | 0 (0) | 12-24 (0.3-0.61) | 36-48 (0.91-1.22) |
| Flux media normal, gpm/sq ft (liters per minute/sq meter) | 0 (0) | 3-6 (122.2-244.5) | 15 (611.2) |
| Solids Loading, lbs/day/sq ft (kg/day/sq meter) | 0 (0) | 2 (9.58) | 20 (95.8) |

It should be noted that the low end pleat height is based on a micropleat design with thin panels having many tiny pleats, while the high end design is based on a thick panel design. In addition, the low end included angle is possible due to the unexpected finding that solids can be easily removed from the valleys, and that the risk of being unable to clean the valleys was very low. The velocity past the cleaning nozzles is at least partially a function of the size of the discs with smaller discs allowing for higher angular velocities.

Figure 25:
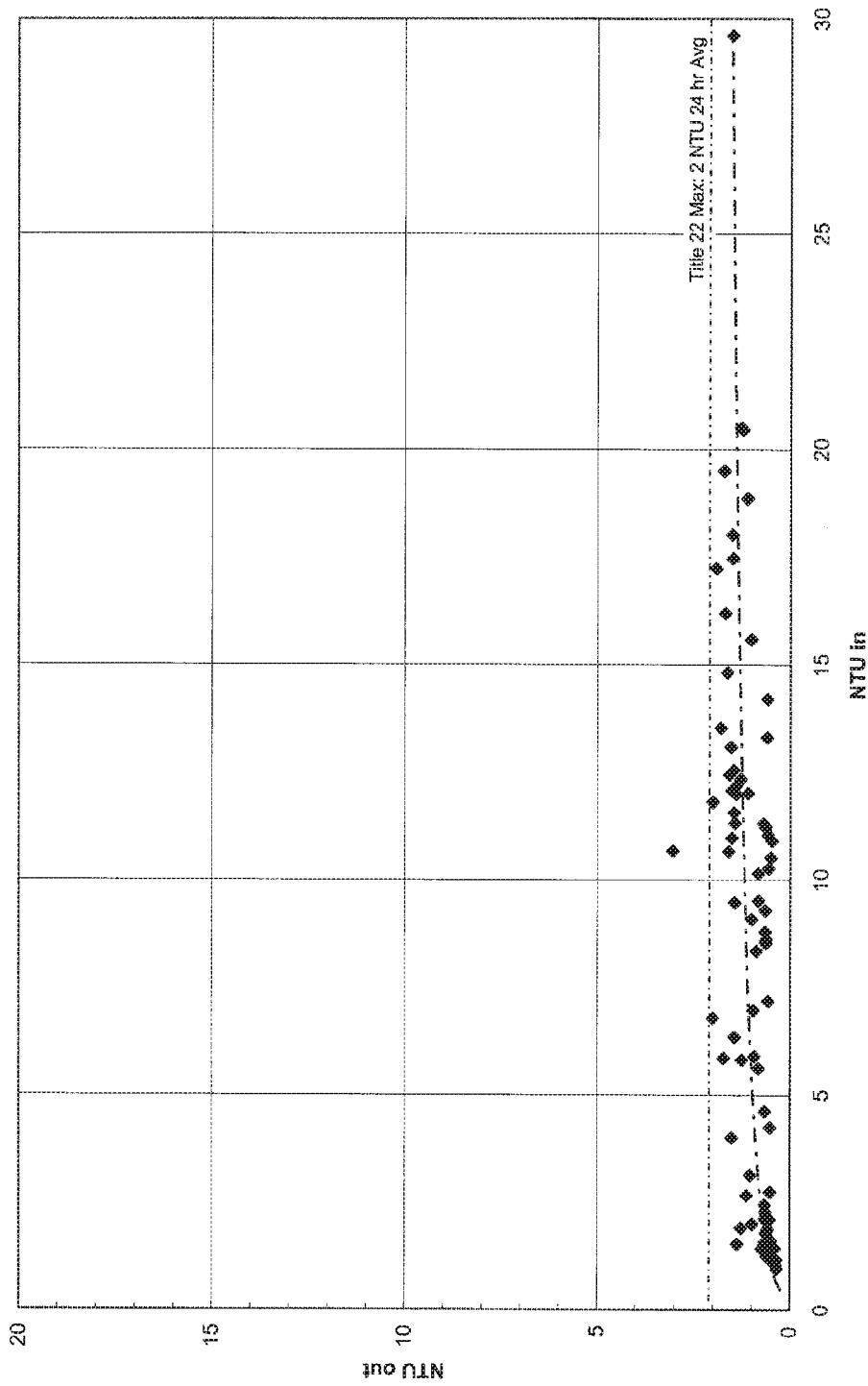
FIG. 25 is a graph illustrating the reduced turbidity of fluid that passes through a filter as illustrated herein.

While there are many variations of the design described herein, one filter has been field tested and produced a reduction in turbidity measured in Nephelometric Turbidity Units (NTU) as illustrated in the graph of FIG. 25. Of course other arrangements may provide better or worse performance depending on the particular arrangement.

It should be noted that the invention described herein is also well-suited for existing applications. For example, an existing filter can be modified to incorporate the present invention. Such a modification would increase the flow rate and reduce the pressure drop through the filter without increasing the footprint of the filter. In this application, the existing non-pleated filter media is removed from the drum. Filter supports are coupled to the drum and pleated filter panels are inserted into the filter supports to complete the modification. In preferred constructions, the filter supports are molded from plastic with other materials (e.g., metal) also being suitable for use.

While most of the figures illustrate discs 30 that include filter panels 125 that are substantially aligned, FIGS. 36 and 37 illustrate another arrangement in which the filter panels 125 of a first panel set 1285 of the disc 30 are rotated with respect to the filter panels 125 of a second panel set 1290 (shown in broken lines) of the disc 30. In the arrangement of FIG. 36, the center axis 1287 for each panel 125 in the first panel set 1285 is offset relative to the center axis 1292 of each filter panel 125 in the second panel set 1290 to form offset filter panel pairs. By way of example, the filter panel pairs may be offset by a first distance 1297 equal to approximately half of a filter segment 1300.

Thus, the invention provides, among other things, a new and useful filter panel 125 for use in a disc filter 10. The filter panel 125 includes pleated filter media 15 that increases the overall surface area per unit area that can be used for filtration, and retains the pleated shape of the media against the turbulent and viscous forces generated at high flow rates of liquid.

What is claimed is:

1. A filter device configured to filter a liquid, the filter device comprising:
a drum sized to receive the liquid;
a plurality of filter panels coupled to the drum to define a plurality of discs, each filter panel of the plurality of filter panels comprising a perimeter frame defining a panel flow area and a filter media coupled to the perimeter frame, the filter media of at least one of the plurality of filter panels including a plurality of pleats and at least one reinforcing member configured to maintain a pleated shape of the filter media; and
a plurality of spray bars positioned between adjacent discs and each end of the filter device, each spray bar of the plurality of spray bars comprising a plurality of spray nozzles configured to spray water in a reverse flow direction through the plurality of filter panels, each spray bar of the plurality of spray bars including multiple spray points, with four spray nozzles of the plurality of spray nozzles at each of the multiple spray points,
each spray nozzle of the plurality of spray nozzles having an outlet orifice angled in a direction substantially normal to a pleat of a disc and angled at about 90 degrees with respect to the outlet orifice of an adjacent spray nozzle of the plurality of spray nozzles at the same spray point.

2. The filter device of claim 1, wherein the perimeter frame includes two substantially parallel sides and two sides that extend along lines that are substantially radial with respect to the drum.

3. The filter panel of claim 1, wherein the filter media includes a cloth material.

4. The filter device of claim 1, wherein the at least one reinforcing member includes at least one stringer extending across the panel flow area, and a plurality of ridge bars extending from the at least one stringer in a direction substantially normal to the at least one stringer.

5. The filter device of claim 4, wherein the at least one stringer includes a plurality of saw tooths that engage the plurality of pleats.

6. The filter device of claim 4, wherein the at least one stringer includes a first side that includes saw tooths and a second side that includes saw tooths, and wherein the plurality of pleats are sandwiched between the first side and the second side.

7. The filter device of claim 4, wherein the at least one stringer is one of a plurality of stringers, each stringer of the plurality of stringers including saw tooths that engage the plurality of pleats.

8. The filter device of claim 4, wherein the plurality of pleats define a plurality of peaks and valleys, and wherein each ridge bar of the plurality of ridge bars is positioned adjacent one peak and valley of the plurality of peaks and valleys.

9. The filter device of claim 4, wherein the perimeter frame, the at least one stringer, and the plurality of ridge bars are integrally formed as a single piece around the filter media.

10. The filter device of claim 1, wherein the plurality of pleats define a media flow area that is measured substantially normal to the plurality of pleats and that is substantially greater than the panel flow area.

11. The filter device of claim 1, wherein each filter panel is configured to pass a liquid flow therethrough, the liquid flow being in excess of 3 gallons per minute per square foot and at a pressure differential across the filter media in excess of 12 inches of water.

12. The filter device of claim 1, wherein a water velocity associated with each spray nozzle of the plurality of spray nozzles is an inverse function of a size of a disc adjacent to the spray nozzle.

13. The filter device of claim 12, wherein each spray nozzle of the plurality of spray nozzles is configured to deliver water at a velocity between about 1 and about 50 ft/min.

14. The filter device of claim 1, wherein the outlet orifice of each spray nozzle of the plurality of spray nozzles is angled about 45 degrees off of a plane substantially parallel to a plane of a disc adjacent to the spray nozzle.

\* \* \* \* \*